(12) United States Patent
Gerometta et al.

(10) Patent No.: US 10,344,539 B2
(45) Date of Patent: Jul. 9, 2019

(54) SEALING ARRANGEMENTS FOR SUBSEA PIPE-IN-PIPE SYSTEMS

(71) Applicant: Acergy France SAS, Suresnes (FR)

(72) Inventors: Gerald Gerometta, Paris (FR); Nathalie Delaunay, Saint Germain en Laye (FR); Henri Rousseau, Paris (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 15/547,798

(22) PCT Filed: Feb. 2, 2016

(86) PCT No.: PCT/IB2016/000163
§ 371 (c)(1),
(2) Date: Jul. 31, 2017

(87) PCT Pub. No.: WO2016/125011
PCT Pub. Date: Aug. 11, 2016

(65) Prior Publication Data
US 2018/0051539 A1    Feb. 22, 2018

(30) Foreign Application Priority Data

Feb. 3, 2015 (GB) .................................. 1501775.9
Jul. 2, 2015 (GB) .................................. 1511632.0

(51) Int. Cl.
*E21B 17/00* (2006.01)
*F16L 9/18* (2006.01)
(Continued)

(52) U.S. Cl.
CPC .......... *E21B 17/003* (2013.01); *E21B 36/003* (2013.01); *E21B 36/005* (2013.01);
(Continued)

(58) Field of Classification Search
CPC ......... F16L 7/02; F16L 19/0212; F16L 21/04; F16L 55/1645; F16L 53/38; F16L 25/0081
See application file for complete search history.

(56) References Cited

U.S. PATENT DOCUMENTS 3,964,754 A * 6/1976 Murai ....................... F16L 7/02
277/621
4,193,105 A * 3/1980 Graafmann ............... E21F 5/00
138/103
(Continued)

FOREIGN PATENT DOCUMENTS

BR    P10605003    8/2008
EP    1 509 719    12/2003
(Continued)

*Primary Examiner* — Eugene G Byrd
(74) *Attorney, Agent, or Firm* — Levy & Grandinetti

(57) ABSTRACT

A method of sealing an annulus between inner and outer pipe sections of a pipe-in-pipe system includes positioning a sealing mass in the annulus in contact with the inner and outer pipe sections. Deforming the sealing mass occurs, for example by shearing and compression, by effecting relative longitudinal movement between the inner and outer pipe sections. Fixing the inner and outer pipe sections against reverse relative longitudinal movement to maintain deformation of the sealing mass is then performed. The inner pipe section and a displaced outer pipe section may be fixed by welding them to respective pipes of an adjoining pipe-in-pipe structure. Opposed ramp surfaces, each being similarly inclined relative to the longitudinal direction, extend into the annulus from respective ones of the pipe sections such that the sealing mass may be compressed between the ramp surfaces.

32 Claims, 15 Drawing Sheets

(51) Int. Cl.

| | | |
|---|---|---|
| *F16L 7/00* | (2006.01) | |
| *F16L 59/065* | (2006.01) | |
| *F16L 1/12* | (2006.01) | |
| *F16L 1/16* | (2006.01) | |
| *F17D 1/18* | (2006.01) | |
| *E21B 36/04* | (2006.01) | |
| *E21B 43/01* | (2006.01) | |
| *H05B 3/42* | (2006.01) | |
| *F16L 53/38* | (2018.01) | |
| *F16L 53/30* | (2018.01) | |
| *E21B 36/00* | (2006.01) | |
| *E21B 43/013* | (2006.01) | |
| *F16L 7/02* | (2006.01) | |
| *F16L 9/19* | (2006.01) | |
| *F17D 3/01* | (2006.01) | |

(52) U.S. Cl.
CPC .............. *E21B 36/04* (2013.01); *E21B 43/01* (2013.01); *E21B 43/013* (2013.01); *F16L 1/123* (2013.01); *F16L 1/16* (2013.01); *F16L 7/00* (2013.01); *F16L 7/02* (2013.01); *F16L 9/18* (2013.01); *F16L 9/20* (2013.01); *F16L 53/30* (2018.01); *F16L 53/38* (2018.01); *F16L 59/065* (2013.01); *F17D 1/18* (2013.01); *F17D 3/01* (2013.01); *H05B 3/42* (2013.01); *F16L 9/19* (2013.01); *H05B 2214/03* (2013.01)

(56) References Cited

U.S. PATENT DOCUMENTS

| | | | | |
|---|---|---|---|---|
| 4,293,138 A | * | 10/1981 | Swantee | F16L 5/10 277/607 |
| 4,751,947 A | * | 6/1988 | Landers | B29C 44/185 138/89 |
| 5,071,140 A | * | 12/1991 | Quevedo del Rio | F16J 15/104 220/378 |
| 8,499,844 B2 | * | 8/2013 | Gandikota | E21B 33/1208 166/387 |
| 2003/0017007 A1 | | 1/2003 | Bass et al. | |
| 2003/0178842 A1 | | 9/2003 | Gallagher | |
| 2004/0245768 A1 | | 12/2004 | Giacomelli et al. | |
| 2005/0212285 A1 | | 9/2005 | Haun | |
| 2009/0152817 A1 | * | 6/2009 | Du | F16L 7/02 277/315 |
| 2011/0278835 A1 | * | 11/2011 | Kishi | F16L 17/032 285/18 |
| 2012/0312560 A1 | * | 12/2012 | Bahr | E21B 33/1208 166/387 |
| 2015/0292656 A1 | * | 10/2015 | Kishi | F16L 21/04 251/151 |
| 2015/0300541 A1 | * | 10/2015 | Nielinger | F16L 15/04 285/66 |
| 2015/0338010 A1 | * | 11/2015 | Marchal | F16L 9/18 138/33 |

FOREIGN PATENT DOCUMENTS

| | | | |
|---|---|---|---|
| EP | 2 009 338 | 12/2008 | |
| EP | 2009338 A1 * | 12/2008 | .............. F16L 9/042 |
| FR | 2 991 024 | 11/2013 | |
| FR | 3 021 385 | 11/2015 | |
| GB | 2492883 | 1/2013 | |
| GB | 2493545 | 2/2013 | |
| JP | 09189382 A * | 7/1997 | .............. F16L 21/04 |
| WO | WO 00/06933 | 2/2000 | |
| WO | WO 01/02764 | 1/2001 | |
| WO | WO 02/16732 | 2/2002 | |
| WO | WO 2009/083937 | 7/2009 | |
| WO | WO 2014/029644 | 2/2014 | |

* cited by examiner

SEALING ARRANGEMENTS FOR SUBSEA PIPE-IN-PIPE SYSTEMS

This invention relates to rigid pipelines of pipe-in-pipe ('PiP') construction, suitable for subsea applications. More specifically, the invention relates to electrically trace-heated PiP pipelines, and particularly to sealing arrangements for the annulus of such a pipeline.

Subsea pipelines are used in oil and gas production as 'tie-backs' to transport crude oil and/or natural gas from a subsea wellhead across the seabed on the way to the surface. Typically, in offshore locations, the oil and gas flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters the pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high, typically above 65° C. and in some cases above 200° C., despite thermal exchange with seawater which, for example, is at 4° C. below 1000 m depth.

Low temperature increases the viscosity of the production fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. During shut-down, production is stopped and so no hot fluid flows through the pipeline. Consequently, to avoid clogging by solid-phase materials, mitigating fluid such as methanol or diesel oil is injected into the pipeline during shut-down. When production restarts, temperature within the pipeline must be increased quickly so that no plugs will form.

The challenges of thermal management increase as subsea pipelines become longer. In this respect, there is a trend toward longer tie-backs as oil and gas reserves are being exploited in increasingly challenging locations.

Designers of subsea pipelines have adopted both passive and active approaches to thermal management, either individually or in combination.

In passive thermal management systems, the pipeline is only thermally insulated. One example of a passive system is a PiP structure comprising a fluid-carrying inner pipe positioned concentrically within an outer pipe. The inner and outer pipes may be of steel or composite material, or one pipe may be of steel and the other pipe may be of composite. The pipes are spaced from each other to define an insulating annulus between them. Typically, insulating material is disposed in the annulus; it is also common to draw down a partial vacuum in the annulus to reduce transmission of heat through the annulus.

PiP structures provide high-performance thermal insulation by virtue of the annulus. Their double-walled construction also enhances mechanical strength and leak protection.

In active thermal management systems, a trace heating system typically employs resistive electrical wires running along, and in thermal contact with, the outer surface of a steel pipeline. Heat produced by passing an electric current along the wires is conducted through the pipe wall to the production fluid flowing within. An example of an electrically trace-heated flowline is disclosed in WO 02/16732.

Electrically trace-heated PiP (ETH PiP) employs a combination of passive and active thermal management measures to manage the temperature of production fluids particularly effectively. GB 2492883 and WO 2014/029644 disclose typical electrically trace-heated PiP flowline sections. A further example of electrically trace-heated PiP is shown in FIG. 1 of the drawings.

In a length of ETH PiP as shown in FIG. 1, low-voltage electric heating elements 10 such as copper wires are disposed around a steel inner pipe 12 of a PiP assembly 14. Thus, the heating elements 10 lie within the annulus 16 defined between the inner pipe 12 and an outer pipe 18 of the PiP assembly 14. In this example, the heating elements 10 extend longitudinally along the PiP assembly 14 in parallel to its central longitudinal axis, although the heating elements 10 could instead be twisted helically around the inner pipe 12 or arranged in a wave pattern—known in the art as an S-Z layout—along the inner pipe 12. One or more other longitudinally-extending elements 20 such as fibre-optic data cables or power cables may be positioned beside and between the heating elements 10. The annulus 16 may also contain an insulating layer 22 that overlays the heating elements 10 and other elements 20 as shown. Again, air may be evacuated from the annulus 16.

Although not shown in FIG. 1, electrical power is suitably provided to the heating elements 10 by subsea electrical cables that are connected to the electrically trace-heated PiP system underwater via wet-mateable electrical connectors. Another approach is to splice an end of the heating elements 10 to a subsea electrical cable above the surface, aboard an installation vessel.

Whatever thermal management system is employed, it is important to maintain thermal management continuously along the length of a pipeline. Otherwise, 'cold spots' will arise, which increase the likelihood of plugs forming at those locations. Similarly, for ease of manufacture and for reliability, it is beneficial to avoid discontinuities due to splices or other connections in the heating elements 10 or in other longitudinally-extending elements 20 such as fibre-optic cables.

PiP pipelines may be fabricated offshore on, and laid from, a pipelaying vessel using J-lay or S-lay techniques. In those techniques, PiP pipe joints are welded successively at field joints to an upper end of a pipe string extending as a catenary toward the seabed from a hang-off mechanism or tensioner of the vessel. The welds are tested and the field joints are coated before each new section of the pipe string is launched into the sea. Accessories are incorporated into the pipeline between pipe joints at appropriate intervals and are launched with the pipe string into the sea.

PiP pipelines may also be laid in reel-lay operations, in which the pipeline is prefabricated at a coastal spoolbase that a reel-lay vessel visits for loading. At the spoolbase, the pipeline is spooled onto a reel carried by the vessel. During subsequent pipelaying at sea, the pipeline is unspooled from the reel and straightened. Accessories may be incorporated into the pipeline at appropriate intervals during laying by cutting through an unspooled length of the pipeline and welding the cut ends to opposite sides of the accessory.

Once closed, the annulus of a PiP pipeline can be evacuated on a vessel offshore. However, if possible, the annulus of a PiP pipeline is evacuated during an onshore pre-fabrication process as this removes that operation from the critical path during subsequent offshore operations.

There is a need to provide arrangements for sealing and isolating closed compartments or sections of the annulus of a PiP pipeline. Such sections have to be sealed in an air-tight, vacuum-tight or water-tight manner. For example, where the annulus of a PiP pipeline is evacuated during an onshore pre-fabrication process, effective sealing is necessary to create and maintain a partial vacuum.

Effective sealing may also be necessary to create a waterstop. If the outer pipe is breached due to a failure, a waterstop serves as a barrier that isolates a flooded section of the annulus by preventing seawater entering adjacent sections of the annulus. This makes repair and refurbishment of the damaged pipeline easier and less expensive.

Clearly, a waterstop must resist external hydrostatic pressure if it is to maintain the integrity of the remainder of the pipeline. Hydrostatic pressure on one side of the waterstop exposed to a flooded section of the annulus may of course be extremely high at great depth, whereas pressure on the other side of the waterstop exposed to an adjoining section of the annulus will be very much lower. This imbalance of pressures is greater if the adjoining section of the annulus contains a partial vacuum.

Effective sealing is particularly challenging in ETH PiP arrangements. Here, there is a need to accommodate and seal around longitudinally-extending elements such as heating elements or fibre-optic cables, without introducing discontinuities that will complicate manufacture and that could lead to failures.

A PiP sealing system must also be able to accommodate differential elongation of the inner and outer pipe under thermal influences. In particular, the engagement between the metal of a pipe and a plastics seal must be sufficiently strong to avoid disengagement due to shear stress, which could create a leakage path.

FR 2991024 discloses a full forged steel bulkhead connecting the inner and outer pipes of an ETH PiP system. Bores penetrate the bulkhead, and electrical wires are connected to respective sides of penetrators fitted into the bores. The drawbacks of this solution are fragility, discontinuity and the high cost of penetrators. Also, when the pipeline is bent as during spooling onto a reel, the bulkhead assembly will ovalise slightly in cross-section; penetrators may not ensure sufficient leak-tightness because each bore containing a penetrator will also ovalise locally. Additionally, some bores may remain empty, which will preclude sealing between successive annulus sections separated by the bulkhead.

In BR PI0605003, an elastomeric sealing ring for an ETH PiP system is compressed axially between a closing ring and an L-shaped front ring. This causes the sealing ring to expand radially to fill the full radial width of the annulus and so to seal against the inner and outer pipes. Penetrators for electric cables or optical fibres are carried by the sealing ring or the front ring. All parts are pre-fabricated and assembled inside the annulus. A drawback is that a large number of separate elements need to be assembled, which complicates manufacture and creates failure points. Additionally, leak paths may remain if the sealing ring is not sufficiently expanded radially by longitudinal axial compression.

EP 1509719 discloses a waterstop assembly for an ETH PiP system comprising a polymeric ring that is inserted into the annulus to close the annulus. The ring is penetrated by longitudinal bores for electrical heating cables and contains a sealing system to close the bores around the cables. The ring comprises lip seals that may not be vacuum-tight even if they are water-tight. Also, lip seals are not efficiently tight around cables that move during installation. There remains a need for more effective sealing.

WO 01/02764 discloses a buckle arrestor for a PiP system that is moulded in place inside the annulus to span the full radial width of the annulus between the inner and outer pipes. Whilst a buckle arrestor is designed to provide mechanical resistance and so has a function that is very different to the function of a waterstop, WO 01/02764 suggests that the moulded-in-place buckle arrestor may be leak-tight. However, there is no teaching of how the buckle arrestor could be interfaced with longitudinally-extending elements such as heating elements or fibre-optic cables, which as noted above present special challenges for effective sealing.

WO 00/06933 discloses a pipe liner for inserting into a pipeline, the liner comprising channels that accommodate longitudinally-extending heating elements.

US 2003/017007 discloses water stops formed in the annulus of a direct electrically heated (DEH) pipe-in-pipe arrangement by placing a liquid polymer between two rubber seals provided in the annulus and allowing the polymer to cure.

US 2003/178842 discloses spacing rings held between confronting abutment surfaces of inner and outer pipes to prevent radial or axial movement of the inner pipe relative to the outer pipe. The rings are formed from a low-conductivity material such as nylon to insulate the inner and outer pipes from each other thermally and electrically.

It is against this background that the invention has been devised.

In one sense, the invention resides in a method of sealing an annulus between inner and outer pipe sections of a pipe-in-pipe system. The method comprises: positioning a sealing mass in the annulus in contact with the inner and outer pipe sections; deforming the sealing mass by effecting relative longitudinal movement between the inner and outer pipe sections; and fixing the inner and outer pipe sections against reverse relative longitudinal movement to maintain deformation of the sealing mass.

The sealing mass may be sheared and/or compressed between the inner and outer pipe sections. For example, the sealing mass may be compressed by advancing a ramp surface extending into the annulus from at least one of the inner and outer pipe sections, the ramp surface being inclined relative to the direction of longitudinal movement. Preferably, the sealing mass is compressed between opposed ramp surfaces that extend into the annulus from respective ones of the inner and outer pipe sections, such that the relative longitudinal movement between the inner and outer pipe sections moves the opposed ramp surfaces toward each other to compress and hence deform the sealing mass. The or each ramp surface suitably has a shallow inclination, which may be as little as 5° to 10° relative to the direction of longitudinal movement.

The sealing mass may be positioned by casting or moulding it in situ in the annulus between the inner and outer pipe sections. It is also possible to position the sealing mass on the inner pipe section before placing the outer pipe section around the sealing mass and the inner pipe section.

In an ETH PiP system, the sealing mass is suitably positioned around at least one heating element extending longitudinally along the annulus. Thus, the method of the invention may comprise the preliminary step of placing the or each heating element on the inner pipe section. For example, the or each heating element may be diverted over a radial projection of the inner pipe section. However, it is possible instead for the or each heating element to extend through a radial projection of the inner pipe section. Elongate elements other than heating elements are also possible.

The method of the invention may involve: providing a pipe-in-pipe structure comprising inner and outer pipes; fixing the inner pipe section to an inner pipe of the structure; arranging the outer pipe section around the inner pipe section, axially spaced from the outer pipe of the structure; placing the sealing mass between opposed faces of the inner and outer pipe sections; displacing the outer pipe section toward the structure to deform the sealing mass; and fixing the displaced outer pipe section to the outer pipe of the structure. Conveniently, the inner pipe section and the displaced outer pipe section may be fixed by welding them to the respective pipes of the structure.

The inventive concept also finds expression in a pipe-in-pipe system comprising an annulus defined between inner and outer pipe sections. The system comprises: a sealing mass positioned in the annulus in contact with the pipe sections, the sealing mass having been deformed by relative longitudinal movement between the pipe sections; and at least one fixing at an end of at least one of the pipe sections that holds the pipe sections against reverse relative longitudinal movement to maintain the deformation of the sealing mass. For example, the or each fixing may comprise a weld between the outer pipe section and an outer pipe of an adjoining pipe-in-pipe structure.

Where at least one ramp surface extends into the annulus from at least one of the pipe sections toward the other of the pipe sections, the or each ramp surface is inclined relative to the longitudinal direction and bears on the sealing mass to deform the sealing mass. Preferably, a ramp surface extending into the annulus from the inner pipe section faces away from the or each fixing whereas a ramp surface extending into the annulus from the outer pipe section faces toward the or each fixing. Most preferably, opposed ramp surfaces, each inclined relative to the longitudinal direction, extend into the annulus from respective ones of the pipe sections so that the sealing mass is compressed between the ramp surfaces. In that case, the ramp surfaces preferably have substantially identical inclinations relative to the longitudinal direction.

At least one projection suitably extends radially into the annulus from at least one of the pipe sections toward the other of the pipe sections to define the or each ramp surface. The or each radially-extending projection preferably has a smoothly-rounded apex adjoining the ramp surface. In that case, where the sealing mass surrounds at least one elongate element such as a heating element extending longitudinally along the annulus, the or each elongate element may be diverted over a radially-extending projection of the inner pipe section and around the smoothly-rounded apex. However it is possible for the or each elongate element to extend through a radially-extending projection of the inner or outer pipe section.

In outline, the invention creates a reelable bulkhead or sealing arrangement inside the annulus of a pipe-in-pipe system that allows continuous heating elements or other wires or cables to cross the bulkhead. The invention maintains effective sealing to sustain a differential pressure on opposites sides of the bulkhead, and is thermally efficient to limit thermal bridging between the inner and outer pipes. Effective sealing requires substantial airtightness to vacuum or partial vacuum or hermetic sealing to any fluid in the annulus, such as seawater or air, whether in overpressure or underpressure.

Briefly, therefore, the invention provides a means for holding elevated pressure versus reduced pressure between consecutive annulus sections of an electrically trace-heated pipe-in-pipe flowline system. To achieve this, the invention provides one or more elastomeric parts, for example of a polymer such as polypropylene, that are moulded in situ between the inner and outer pipes and around elongate elements such as heating wires and fibre-optic cables. There is no need for any electrical or optical discontinuity in those elements, such as a spliced connection.

The sealing provided by the invention has two functions: to provide a water stop in case of flooding of the annulus; and more importantly, in practice, to provide airtight sealing during storage and spooling processes and during installation. Airtight sealing allows a vacuum to be drawn down and maintained in the annulus before welding a bulkhead and before connection of successive stalks. This allows greater flexibility regarding when the bulkhead is welded on because previously the first constraint mitigated by the bulkhead is to close the annulus before handling the stalk. With airtight sealing by virtue of the invention, adding the bulkhead can be delayed or can be performed at a non-critical time.

In preferred embodiments, the invention implements a male slope or tooth on the outer face of the inner pipe opposed to a female slope or tooth on the inner face of the outer pipe, where elongate elements such as wires or cables cross the sealing arrangement. With those elements in place between the male and female slopes, a sealing mass is injected, cast or overcast between the slopes (and, optionally, longitudinally beyond the slopes) with or without the assistance of elevated or reduced pressure. A minimum clearance is maintained between the outer pipe and the flowline inner pipe.

The sealing mass fully covers the elongate elements, adhering to or at least bearing against the elements and/or against the inner and/or outer pipes where the elements cross the arrangement. The sealing mass may be of a soft or hard material such as a polymer, elastomer or silicone. Next, the material of the sealing mass is pre-stressed by displacing the outer pipe in the direction of an adjacent flowline outer pipe section in order to reduce the gap between the male and female slopes or teeth. The outer pipe is then welded or otherwise mechanically linked to the flowline outer pipe section in order to maintain a permanent pressure field in the material of the sealing mass and consequently around the elongate elements and against both inner and outer pipes where the elements cross the sealing arrangement. This pressure exerted through the sealing mass guarantees airtightness to vacuum or partial vacuum or hermetic sealing to any fluid in overpressure or underpressure.

A wedging effect between the interacting male and female slopes allows the seal to be pre-compressed so that leak-tightness is improved even if there is insufficient adherence between the seal and the surrounding metal. Generally, such a seal will be located near end bulkheads, typically less than 10 m from the end bulkheads, that provide a fixed mechanical point. This limits possible axial motion of the pipes.

The inclination of the slope is selected to give sufficient compression while keeping an obtuse angle at a smoothened or rounded top of the slope for contact with the elongate elements. This means that no grooves through the teeth are required to accommodate the elongate elements, although such grooves remain optional in the broadest sense of the invention.

Broadly, the invention is embodied as an electrically trace-heated pipe-in-pipe structure, comprising: an inner ring spaced within an outer ring to define an annulus between said rings; a restriction at which the annulus is narrowed radially; at least one elongate heating element extending generally longitudinally along the annulus and through the restriction; and at least one sealing mass that is moulded in situ to close the restriction by bridging the restriction radially, and to embed the or each heating element in the restriction. The annulus may, for example, be narrowed by at least one projection that extends radially into the annulus from at least one of said rings toward the other of said rings, and that may be integral with either of the rings. The or each projection has a face for contacting the sealing mass, which face is preferably inclined to define a male or female slope.

A ring, a projection, or at least a part of a ring that defines the restriction, such as a projection that is integral with a ring, may typically be a short tubular section whose diameter may exceed its length. Also, a ring, a projection, or a part of a ring that defines the restriction may either be separate from and attached to longer pipe sections or integral with longer pipe sections. For example, for steel pipe, it may ease manufacture to weld a ring with an internal projection in series with inner and/or outer pipe sections. Conversely, for composite pipe, it may be easier to vary the cross-section of the inner and/or outer pipes locally during extrusion or pultrusion of the whole pipe, such that a ring with an internal projection is integral with the pipe.

A ring and a projection could be of the same material, being integral with each other or attached to each other by, for example, welding or bonding. Alternatively, a ring and a projection could be of different materials attached to each other by, for example, welding or bonding.

Possible materials for a ring and/or a projection include metals, plastics and composites. If the ring and/or the projection are of plastics material, this may allow better management of shear stress when the inner pipe expands and contracts relative to the outer pipe in use.

The restriction enables a stable, strong and effective seal to be made between successive sections of an annulus and enables that seal to be made with less filler material, which reduces cost and saves time.

Elongate elements other than heating elements, such as data cables and/or fibre optics, may also extend generally longitudinally along the annulus and through the restriction to be embedded by the or each sealing mass.

At least one of the inner and outer rings may be integral with, or attached to, an inner or outer pipe.

Preferably, the system further comprises at least one insulating layer disposed in the annulus on a radially outer side of the or each heating element, which insulating layer is longitudinally interrupted at the restriction. This allows the or each sealing mass to seal effectively against the inner and outer pipes and/or against the or each projection that defines the restriction.

The or each heating element may, for example, extend longitudinally across at least one projection that defines the restriction, by following an external contour of that projection. For instance, the or each heating element may lie externally upon and extend around that projection from one longitudinal side of the projection to the other. It is, however, possible for the or each heating element to extend through a female formation such as a groove or bore in at least one projection that defines the restriction or between at least two of such projections.

The or each projection reduces the likelihood of a leak by reducing the area of the interface between a pipe and the seal, providing fewer and longer leak paths. Additionally, shear stress caused by differential expansion of the inner and outer pipes is easier to manage with a smaller, more compact seal.

In some embodiments of the invention, the restriction is circumferentially continuous around the inner ring, being partially defined by a circumferentially-continuous land of the or each radially-extending projection.

The restriction may be defined between an inner projection that projects radially outwardly from the inner ring and an outer projection that projects radially inwardly from the outer ring. In that case, the projections suitably confront each other across the narrowed annulus, and the or each sealing mass seals against the projections and around the or each heating element extending through a gap between the projections, to close the gap.

A respective sealing mass may seal around the or each heating element extending through one or more bores between the projections, to close the or each bore. Thus, a plurality of heating elements may extend individually through a corresponding plurality of bores, each bore containing a respective sealing mass that seals around a respective one of the heating elements and that closes the bore. Nevertheless, two or more of the sealing masses may be joined outside the bores.

To introduce a flowable filler material that sets, hardens or cures to form the or each sealing mass, the structure of the invention may further comprise at least one circumferentially-extending filling channel that communicates between at least one port in the outer ring and the restriction. For example, the filling channel may intersect radially with the restriction, preferably by joining circumferentially-spaced longitudinally-extending bores or grooves that receive the elongate elements. Alternatively, the filling channel may be positioned radially outboard of the restriction in the outer ring and/or in a projection that extends radially into the annulus from the outer ring. In that case, the filling channel may communicate with a plurality of further channels that lead to the restriction. In another approach, the filling channel may be radially outboard of the outer ring and may communicate with a plurality of ports in the outer ring that lead to the restriction.

The inventive concept embraces a corresponding method of fabricating a tight seal in the annulus of a pipe-in-pipe structure, the method comprising: providing a section of pipe-in-pipe comprising inner and outer pipes; welding an inner pipe piece to an inner pipe of said section, said inner pipe piece comprising an outer wedge ring; arranging an outer pipe piece around said inner pipe piece, axially spaced from the outer pipe of said section, said outer pipe piece comprising an inner wedge ring facing the outer wedge ring of the inner pipe piece, manufacturing a seal between opposed faces of the inner and outer wedge rings; axially pushing the outer pipe piece towards said section to deform the seal; and welding the outer pipe piece to the outer pipe of said section.

The method may comprise introducing a flowable filler material to mould in situ one or more sealing masses that close a restriction at which the annulus is narrowed radially and that embed at least one heating element that extends generally longitudinally through the restriction.

The sealing mass may be extended into at least one space of the restriction at which the annulus tapers longitudinally.

The or each heating element may be placed into the restriction before moulding the filler material. For example, the or each heating element may be inserted into one or more bores of the restriction.

Alternatively, the restriction may be created around the or each heating element before moulding the filler material. For example, the or each heating element may be supported on the inner ring and then the outer ring may be placed around the or each heating element to complete the restriction. This may involve opposing the or each heating element with a projection of the outer ring that at least partially defines the restriction. In some embodiments, the or each heating element is laid across a projection of the inner ring that at least partially defines the restriction, the or each heating element following an external contour of that projection.

The filler material may be introduced into the restriction through the outer ring, in which case the filler material may be distributed circumferentially before entering the restriction. Alternatively, the filler material may be introduced into the restriction along the annulus. In either case, it is possible for the filler material to be divided between circumferentially-spaced bores of the restriction.

Specific embodiments of the invention have two radial protrusions integral with inner and outer pipes that define a restriction of the surface of the annulus at a pre-determined location. Heating cables and fibre-optic cables are installed along the inner pipe and through this restricted section. Polymeric material is injected, for example using a hose with a nozzle inside the annulus, all around the annulus to close the annulus at this pre-determined location, so that it ensures vacuum-tightness and water-tightness.

The protrusions may instead be parts of two rings welded to the inner and outer pipes. The protrusion of the outer pipe may also comprise bores and ports for injecting the polymer from outside the outer pipe rather than through the annulus. Ports are closed by welding plugs. If the bulkhead or the rings are of cast steel, an internal ring bore can be used as a manifold.

Either or both of the inner and outer pipes may be of composite material.

Thus, the invention provides a tight closure of the cross-section of a pipe-in-pipe annulus, in which:
  at least one elongate element traverses a tight closure structure from one side to the other side; and
  hardening polymer material is injected into the tight closure structure to seal the tight closure, said polymer material being hardened after the elongate element is installed through the tight closure structure to ensure tightness to air and water.

The invention also involves manufacturing a tight closure of the cross-section of a pipe-in-pipe annulus, by:
  installing at least one elongate element along an inner pipe of the pipe-in-pipe through a tight closure structure;
  inserting the inner pipe into an outer pipe; and
  closing the tight closure by injecting a flowable polymer material and then hardening said polymer material.

Reference has already been made to FIG. 1 of the appended drawings, which is a cut-away perspective view of a length of ETH PiP pipeline known in the prior art. In order that the invention may be more readily understood, reference will now be made, by way of example, to the remaining drawings in which.

Figure 1:
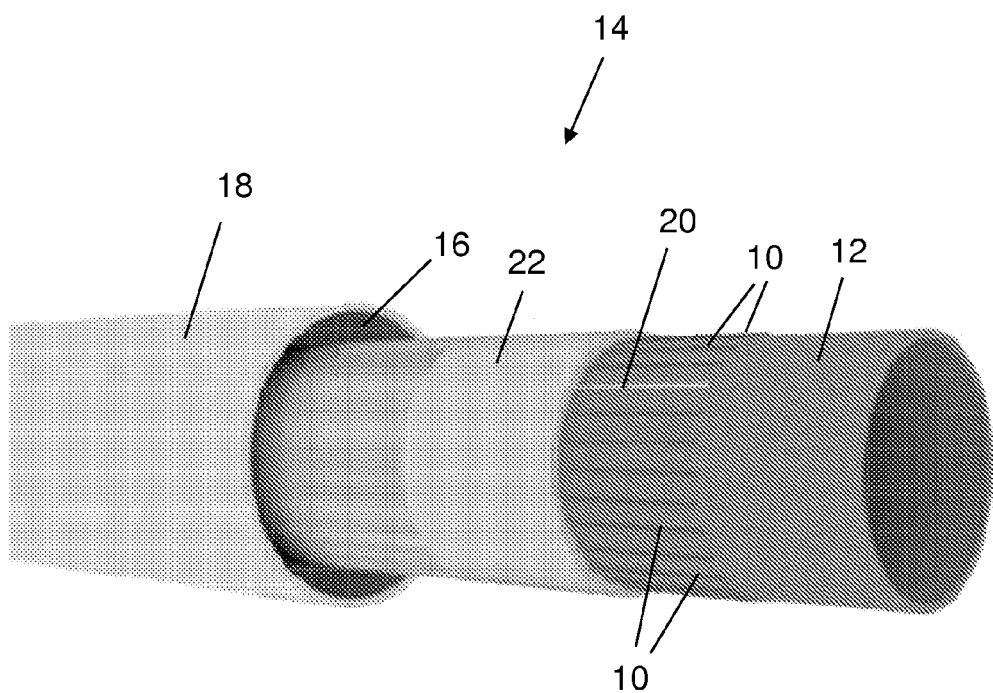

Like numerals are used for like parts throughout the drawings. Thus, the various sealing or bulkhead arrangements of the invention described with reference to FIGS. 2a to 19 each comprise an inner flowline pipe 12 and an outer pipe 18 defining an annulus 16 in the space between them. Some of those drawings show electric heating elements 10 that extend longitudinally along the annulus 16 between the inner pipe 12 and the outer pipe 18. Some of those drawings also show an insulating layer 22 that overlays the heating elements 10, which layer 22 is optional in all embodiments.

As FIG. 1 shows, other longitudinally-extending elements such as fibre-optic data cables, power cables or cables for monitoring sensors may be positioned beside and between the heating elements 10. For ease of illustration, such other elements have been omitted from FIGS. 2a to 19 but they could of course be present in practical embodiments of the invention.

In each of FIGS. 2a to 19, provision is made for heating elements 10 in the annulus 16 around the inner pipe 12 to extend continuously through sealing or bulkhead arrangements that may be spaced along a pipeline. There is no need for additional electrical connections or to interrupt thermal management.

The principles of the invention can be applied to various sealing arrangements. The sealing arrangements shown in FIGS. 2a to 5b are preferred examples, but FIGS. 6 to 19 show other possible examples of sealing or bulkhead arrangements that could in principle be made by a method of the invention involving relative axial movement between the inner pipe 12 and the outer pipe 18 to deform an intermediate sealing filler mass in the annulus 16.

In the sealing arrangements 11, 13 shown in FIGS. 2a to 5b, circumferentially-spaced heating elements 10 extend longitudinally and continuously along the annulus 16 between the inner pipe 12 and the outer pipe 18. The heating elements 10 need not extend parallel to the pipes 12,18 but could, for example, follow a helical or other path along and around the inner pipe 12. Insulating layers 22 have been omitted from these views for clarity. The concentric pipes 12, 18 share a common central longitudinal axis 15 as shown in the exploded view of FIG. 3.

In practical terms, the common central longitudinal axis 15 is a theoretical approximation that best applies when considering the entire pipeline section. In reality, even with spacers between the inner and outer pipes 12, 18, the inner pipe 12 will bend downwards between its ends under the influence of gravity and indeed may crush any insulating material in the annulus 16 beneath. The outer pipe 18 is also slightly and negligibly curved under the influence of gravity acting between longitudinally-spaced supports or rollers. Thus, the average axes of the inner and outer pipes 12, 18 are both slightly curved and hence the inner and outer pipes 12, 18 may be non-concentric along at least some of their length. However, the central longitudinal axis of the inner pipe 12 remains substantially parallel to, and nominally aligned with, the central longitudinal axis of the outer pipe 18.

Figure 2A:
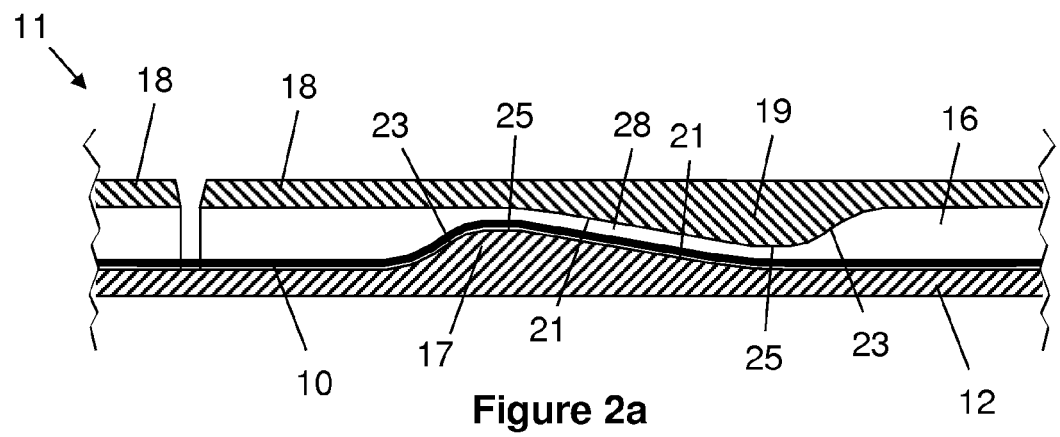
FIGS. 2a to 2c are a sequence of schematic sectional views showing the manufacture of an ETH PiP sealing arrangement of the invention.
Figure 2B:
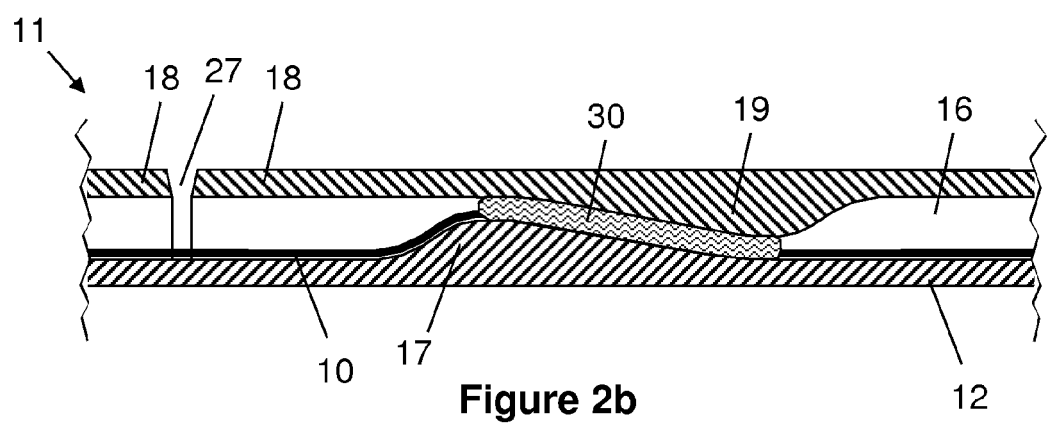
Figure 2C:
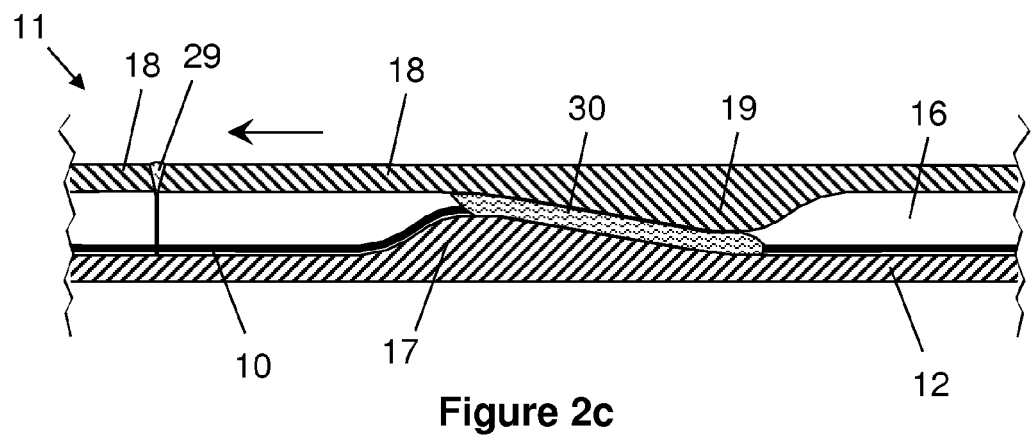

In the sealing arrangement 11 shown in FIGS. 2a to 2c, the heating elements 10 extend beside each other through a circumferentially-continuous throat region 28 of the annulus 16. In the throat region 28, the radial width of the annulus 16 is restricted in comparison with the full radial width of the annulus 16 between the inner and outer pipes 12, 18. As a result, the radial width of the annulus 16 in the throat region 28 is only slightly greater than the thickness of the heating elements 10 that traverse the restriction.

The throat region 28 of the annulus 16 in FIGS. 2a to 2c is defined between circumferential interlocking projections 17, 19 in the annulus 16. Specifically, an inner projection 17 projects radially outwardly into the annulus 16 from the inner pipe 12 toward the outer pipe 18; and a longitudinally- and radially-opposed outer projection 19 projects radially inwardly into the annulus 16 from the outer pipe 18 toward the inner pipe 12.

Figure 3:
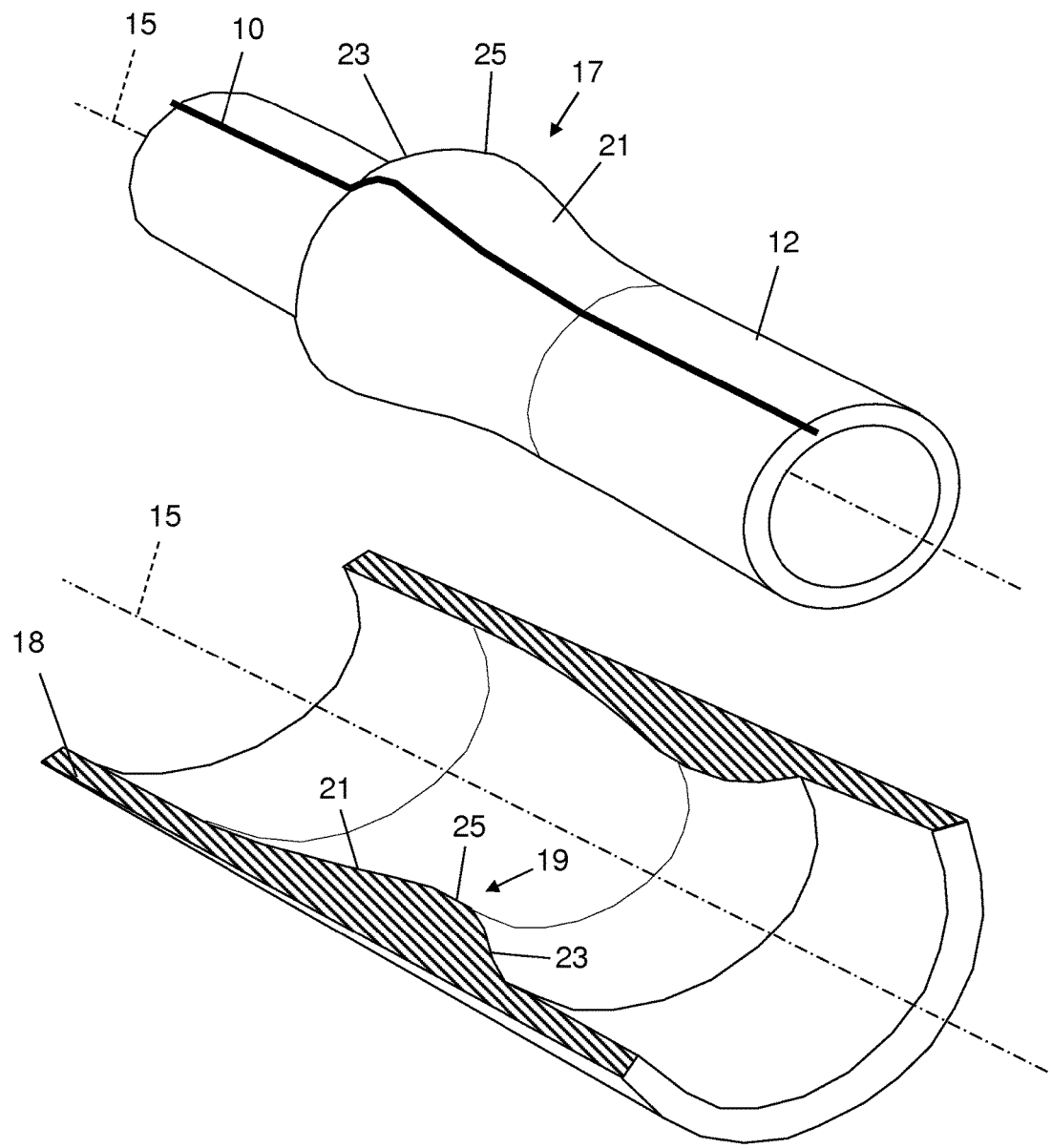
FIG. 3 is an exploded schematic perspective view of inner and outer pipes of the sealing arrangement shown in FIGS. 2a to 2c, showing the outer pipe in longitudinal section.

As best appreciated in the exploded perspective view of FIG. 3, the inner projection 17 is a generally frusto-conical protrusion surrounding the inner pipe 12 and the outer projection 19 is a complementary female formation within the outer pipe 18.

Thus, in longitudinal section as shown in FIGS. 2a to 2c, the inner and outer projections 17, 19 are generally wedge-shaped, comprising shallowly-inclined frusto-conical opposed facing surfaces 21 and oppositely-tapered, more steeply-inclined back surfaces 23. The facing surfaces 21 may, for example, be at an angle of 5° to 10° to the common central longitudinal axis 15 of the concentric pipes 12, 18 and to the adjoining parallel walls of the pipes 12, 18. Preferably, the facing surfaces 21 of the projections 17, 19 are inclined at similar angles to the respective pipes 12, 18 and so are generally parallel to each other in longitudinal section as shown in FIGS. 2a to 2c.

The facing surfaces 21 and the back surfaces 23 each extend from radiused junctions with the associated pipe 12, 18 to meet at a rounded apex 25 of each projection 17, 19. The inclination of the facing surfaces 21 and the back surfaces 23 suits the projections 17, 19 to manufacture by forging. Also, the rounded apex 25 and the radiused junctions between the facing surfaces 21, the back surfaces 23 and the pipes 12, 18 allow the heating elements 10 to pass over the projections 17, 19 rather than extending through the projections 17, 19. One such heating element 10 is shown laid upon the inner pipe 12 and over the inner projection 17 in the exploded view of FIG. 3. In practice, there will, of course, be several more heating elements 10 as exemplified in FIG. 1.

Preferably, as best appreciated in FIGS. 2a to 2c, the projections 17, 19 project far enough into the annulus 16 in their respective radial directions that there is an interlocking radial overlap between their facing surfaces 21, which therefore define confronting faces of the projections 17, 19. Thus, the radially outermost apex 25 of the inner projection 17 lies on a greater circumference than the radially innermost apex 25 of the outer projection 19. In other words, the radially outermost apex 25 of the inner projection 17 is radially outboard of the radially innermost apex 25 of the outer projection 19.

To give clearance for their interlocking overlap, the facing surfaces 21 of the projections 17, 19 are spaced longitudinally from each other along the common central longitudinal axis 15 of the concentric pipes 12, 18. As the inner and outer projections 17, 19 lie in mutually-opposed orientations, the radially-overlapping facing surfaces 21 of the projections 17, 19 confront each other across an insulating gap that isolates the projections 17, 19, and thus the pipes 12, 18, from each other thermally.

Neither projection 17, 19 extends across the full radial depth of the annulus 16. Thus, the radially outermost apex 25 of the inner projection 17 is spaced from the inside of the outer pipe 18 and the radially innermost apex 25 of the outer projection 19 is spaced from the outside of the inner pipe 12.

To make a mechanical connection between the inner and outer pipes 12, 18 and to seal the annulus 16, the gap between the facing surfaces 21 of the projections 17, 19 defining the throat region 28 is filled by an insulating injection-moulded elastomeric filler material 30 that is sandwiched between the facing surfaces 21. In that position, the filler 30 transmits axial forces between the projections 17, 19 and thus between the pipes 12, 18 and maintains the radial spacing between the pipes 12, 18. However, during manufacture, spacers or outer centering clamps or rings may be necessary to maintain correct alignment of, and co-axiality between, the inner and outer pipes 12, 18.

FIGS. 6 to 19 show various techniques for placing a sealing mass of filler 30 into the annulus 16 between the inner pipe 12 and the outer pipe 18, which techniques could be used to make the sealing arrangements shown in FIGS. 2a to 5b.

The filler material embeds the heating elements 10 and forms an annular mass of filler 30 that is circumferentially continuous and that spans the annulus 16 from the inner pipe 12 to the outer pipe 18. Thus, the mass of filler 30 is in conforming sealing contact with the heating elements 10 and with the facing surfaces 21 of the projections 17, 19 of both pipes 12, 18 along longitudinally-extending contact interfaces.

The annular mass of filler 30 separates and supports the heating elements 10, fully surrounding, conforming to and sealing against each of those elements 10. Optionally, the mass of filler 30 may extend longitudinally beyond the radially-narrowest part of the throat region 28, for example to fill the full radial width of the annulus 16 between the inner and outer pipes 12, 18. This better engages the mass of filler 30 in the throat region 28 and so helps to resist a large pressure differential between sections of the annulus 16 to each side of the throat region 28.

In accordance with the invention, once the mass of filler 30 has been positioned between the inner and outer pipes 12, 18 as shown in FIG. 2b, relative longitudinal movement between the inner and outer pipes 12, 18 deforms the mass of filler 30 as shown in FIG. 2c. It is preferred that the mass of filler 30 is deformed only after the filler material has cured or solidified, if the filler material is initially in a liquid or molten state.

Specifically, the opposed facing surfaces 21 of the projections 17, 19 slide past each other to impart shear strain to the mass of filler 30 that is engaged with, and hence effectively attached to, those facing surfaces 21 by adhesion or friction. Also, by virtue of their complementarily-inclined interlocking relationship, the opposed facing surfaces 21 of the projections 17, 19 cooperate in a ramping or wedging action to squeeze and compress the mass of filler 30 between the projections 17, 19. Thus, the facing surface 21 of each projection 17, 19 faces in a direction opposed to the direction of relative movement of the other of the pipes 12, 18.

Comparison of FIG. 2b with FIG. 2c shows that, in this example, relative longitudinal movement between the inner and outer pipes 12, 18 is achieved by displacing a section of the outer pipe 18 axially to close a gap 27 between successive sections of the outer pipe 18. Here, abutting ends of the sections of the outer pipe 18 are optionally chamfered, as shown, to facilitate creation of a butt weld 29 between those sections. A gap 27 of say 10 mm to 100 mm may be reduced to say 0 to 5 mm by displacing the section of the outer pipe 18 in readiness for creating the weld 29.

The weld 29 fixes the inner and outer pipes 12, 18 against relative longitudinal movement while maintaining deformation of the mass of filler 30 as shown in FIG. 2c. Thus, in this example, the facing surface 21 of the projection 19 of the outer pipe 18 faces in the direction of movement of the outer pipe 18, that is, toward the end of the section of the outer pipe 18 where the weld 29 will be made.

In principle, it would be possible to move the inner pipe 12 relative to a fixed outer pipe 18 to achieve the desired relative longitudinal movement between the inner and outer pipes 12, 18. However, it is more convenient to move the outer pipe 18 relative to a fixed inner pipe 12 and to fix the inner and outer pipes 12, 18 against relative longitudinal movement by performing a welding operation on the outer pipe 18.

Deforming the mass of filler 30 pre-stresses or pre-compresses the filler material 30 to ensure a permanent pressure field in the filler material 30, in the nature of a hydrostatic pressure field. Thus, the mass of filler 30 exerts pressure upon the heating elements 10 and against the inner and outer pipes 12, 18. That pressure maintains air-tightness or fluid-tightness between successive sections of the annulus 16 to a vacuum or partial vacuum or to any fluid such as water or air, whether in overpressure or underpressure, even with imperfect adhesion between the mass of filler 30 and the metal of the inner and outer pipes 12, 18.

Thus, the invention ensures tight sealing of the annulus 16 around heating elements 10 or other wires, especially during pipeline fabrication when a temporary bulkhead may need to be cut out before welding together long pipeline stalks. In addition, the invention maintains a tight seal of the annulus 16 when the pipeline is stressed as the pipeline bends, as during laying, and in service due to differential thermal expansion of the inner and outer pipes 12, 18.

Figure 4A:
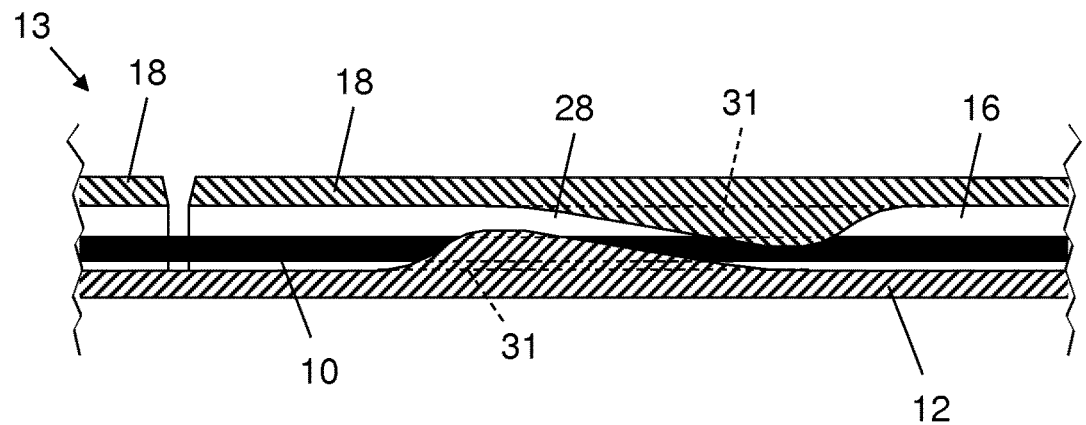
FIGS. 4a to 4c are a sequence of schematic sectional views showing the manufacture of another ETH PiP sealing arrangement of the invention.
Figure 4B:
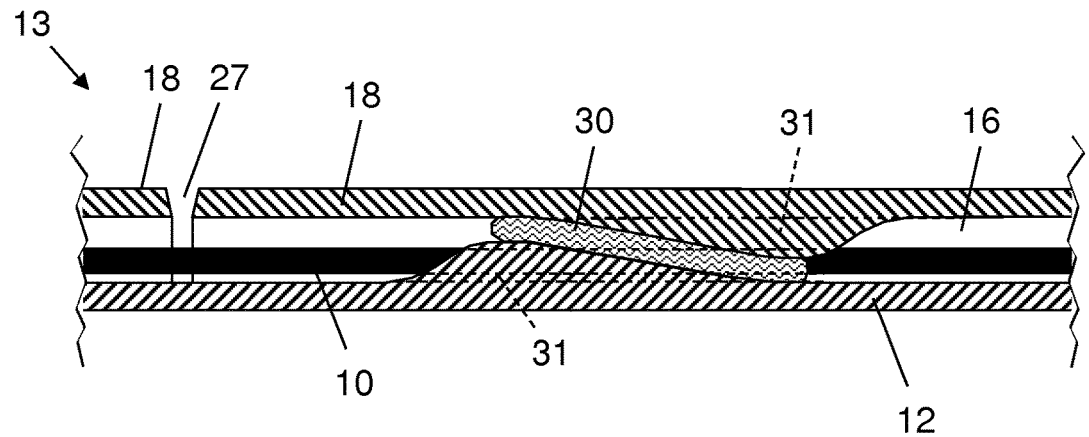
Figure 4C:
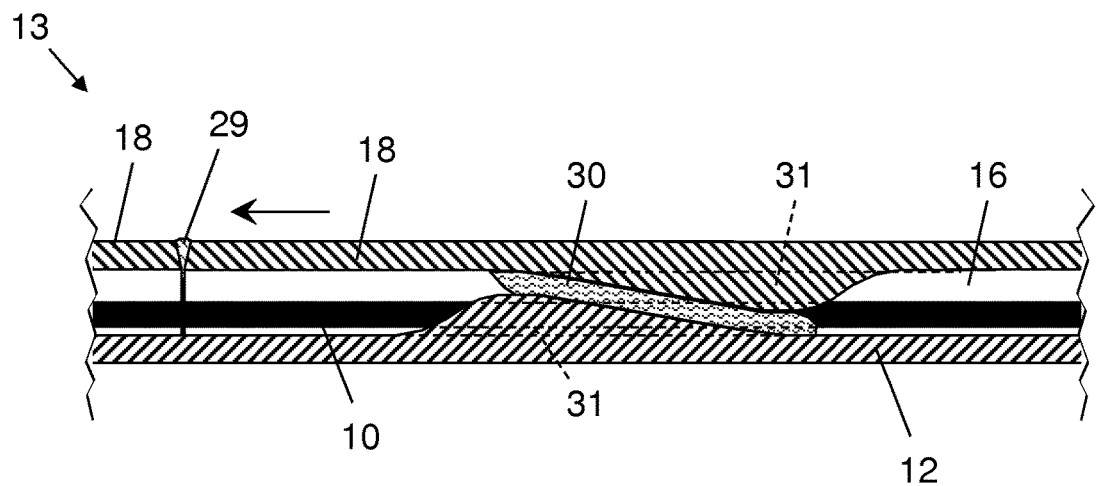

The inner and outer projections 17, 19 are continuous around the full circumference of the annulus 16 in the embodiment shown in FIGS. 2a to 2c and in FIG. 3. Alternatively, the inner and/or outer projections 17, 19 may be interrupted circumferentially as shown in FIGS. 4a to 4c, which correspond to FIGS. 2a to 2c, and in FIGS. 5a and 5b. There, the inner and/or outer projections 17, 19 are interrupted or penetrated by gaps, grooves or holes to accommodate longitudinal heating elements 10 laid on the outside of the inner pipe 12. Otherwise, the generally wedge-shaped inner and outer projections 17, 19 shown in FIGS. 4a to 4c have the same shape, dimensions and interactions as those shown in FIGS. 2a to 2c.

The longitudinal openings or passageways through the inner and/or outer projections 17, 19 defined by gaps, grooves or holes allow the heating elements 10 to extend continuously along a pipeline at the same radius with respect to the central longitudinal axis 11. Thus, the heating elements 10 may extend in straight lines or at least without experiencing acute curvature to traverse the sealing arrangement 13 shown in FIGS. 4a to 4c. This may be useful where the heating elements 10 are relatively thick or inflexible as shown in FIGS. 4a to 4c.

Specifically, in the sealing arrangement 13 shown in FIGS. 4a to 4c, the circumferentially-spaced heating elements 10 extend beside each other through respective circumferentially-spaced, longitudinally-extending grooves 31 disposed in the inner and/or outer projections 17, 19 between the inner and outer pipes 12, 18. The depth of each groove 31 is less than the full radial width of the annulus 16 between the inner and outer pipes 12, 18, and is only slightly greater than the thickness of the heating element 10 that the groove 31 contains. Again, therefore, the radial width of the annulus 16 is restricted in the grooves 31 in comparison with the full radial width of the annulus 16 between the inner and outer pipes 12, 18.

Figure 5A:
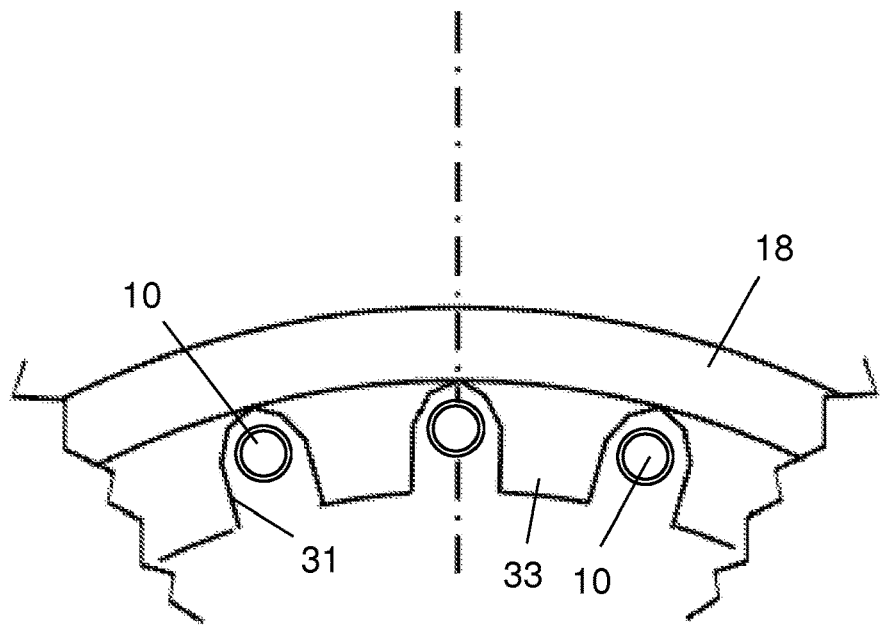
FIGS. 5a and 5b are partial cross-sectional views of the inner and outer pipes of the sealing arrangement shown in FIGS. 4a to 4c.
Figure 5B:
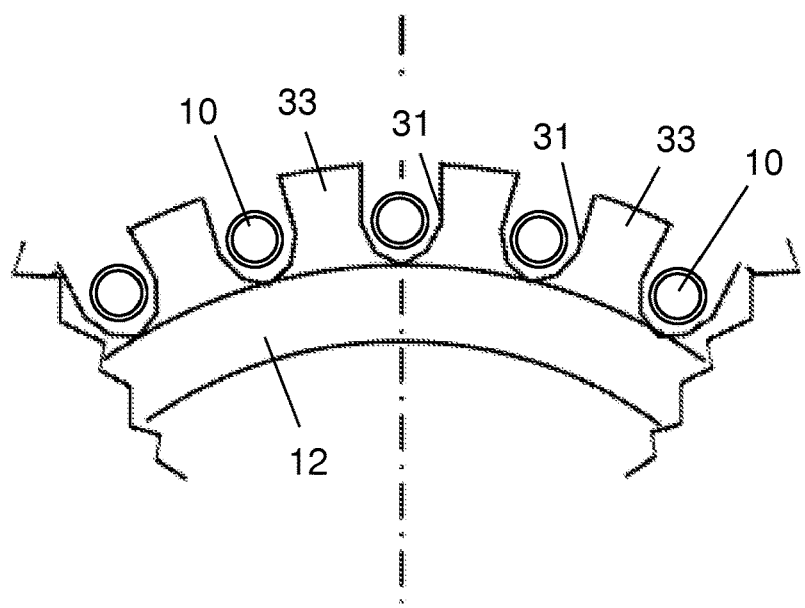

Circumferentially-spaced walls 33 separate the grooves 31 as best appreciated in the cross-sectional view of FIGS. 5a and 5b, from which the filler material 30 has been omitted for clarity. The circumferentially-spaced grooves 31 of the sealing arrangement 13 shown in FIGS. 4a to 4c together join a throat region 28 between the facing surfaces 21 of the inner and outer projections 17, 19, like the throat region 28 of FIGS. 2a to 2c.

The small clearance around each heating element 10 within its groove 31 is filled with an injection-moulded mass of filler 30 that embeds the heating element 10. Thus, the heating elements 10 are separately embedded in bodies of filler 30 in their respective grooves 31. However, it is possible for the bodies of filler 30 to be part of a common filler mass that extends into the grooves 31 and that is joined outside the grooves 31.

A preferred example of a flowable filler material 30 that is suitable for the sealing arrangements 11, 13 of FIGS. 2a to 2c and 4a to 4c is a thermoplastic material such as polypropylene, although a thermoset material such as polyurethane or a polyimide would be possible instead. It is preferred that the tensile breaking strain of the filler material 30, when cured or solidified, is greater than 500%.

Preferred materials for the filler 30 are engineered synthetic polymers that have thermally-insulating qualities to avoid thermal bridging across the annulus 16 even if there is a gap in the insulating layer 22 to enable effective sealing. In this respect, the injected polymer filler 30 surrounds, embeds and seals against the heating elements 10 and seals against the surrounding metal or composite surfaces where the insulating layer 22 is not present, thus creating a gas-tight, vacuum-tight and water-tight seal where a section of the annulus 16 ends.

Preferred polymer materials can withstand the elevated surface temperatures that are typical of a flowline or steel or other material, which may be in excess of 100° C. Preferred polymer materials must also remain sufficiently visco-elastic once cured or hardened to perform the mechanical duty of sealing while accommodating thermal expansion of the pipes and deformation of the pipes such as ovalisation. Particular advantages of using a resilient polymeric filler material 30 to seal the annulus 16 are that it removes the need for penetrators and can better comply with deformation due to ovalisation when spooling a pipe onto a reel.

In practice, sealing arrangements of the invention may be embodied by inner and outer concentric forgings welded in series with the inner and outer pipes 12, 18 respectively. Once welded into position, those forgings become integrated with the inner and outer pipes 12, 18 as an extension of the pipe walls. For ease of illustration, FIGS. 2a to 2c and FIGS. 4a to 4c simply show the inner and outer pipes 12, 18 extending continuously through the sealing arrangements 11, 13 and hence incorporating the forgings.

Figure 6:
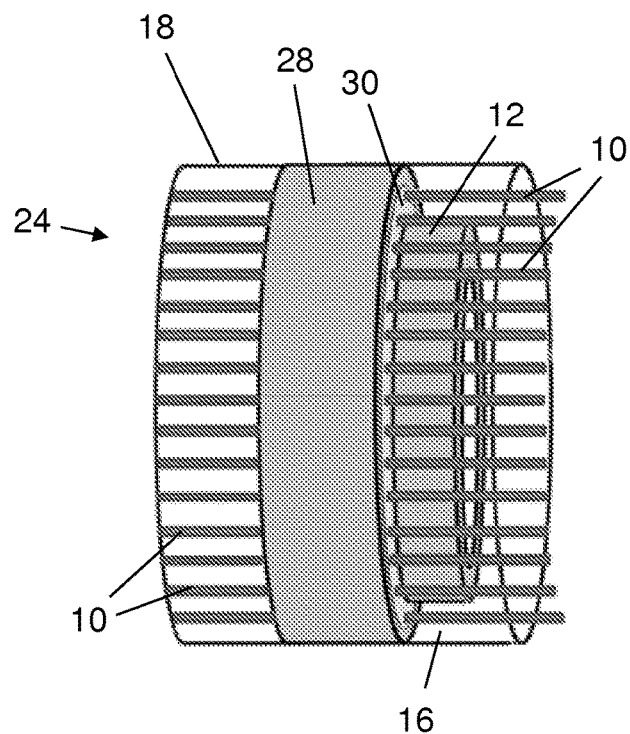
FIGS. 6 and 7 are schematic cut-away perspective views of alternative ETH PiP sealing arrangements that may be made by a method of the invention.
Figure 7:
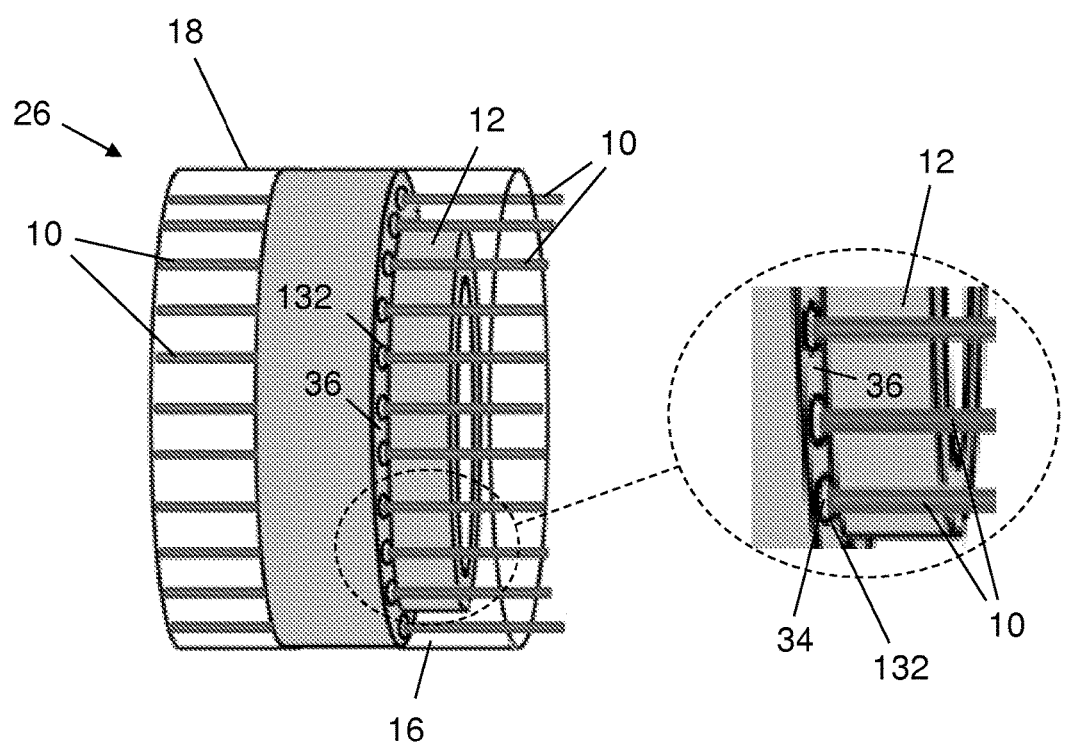

In the sealing arrangements 24, 26 shown in the simplified general views of FIGS. 6 and 7, circumferentially-spaced heating elements 10 extend longitudinally along the annulus 16 between the inner pipe 12 and the outer pipe 18. Again, insulating layers 22 have been omitted from these views for clarity; in any event, insulating layers 22 will be spaced apart or cut away at the location of the sealing arrangements 24, 26 to leave a gap for effective sealing.

In the sealing arrangement 24 shown in FIG. 6, the heating elements 10 extend beside each other through a circumferentially-continuous throat region 28 of the annulus 16. In the throat region 28, the radial width of the annulus 16 is restricted in comparison with the full radial width of the annulus 16 between the inner and outer pipes 12, 18. As a result, the radial width of the annulus 16 in the throat region 28 is only slightly greater than the thickness of the heating elements 10 that traverse the restriction.

The internal formations that define the throat region 28 may, for example, be shaped like those shown in FIGS. 8a to 8g, to be described later.

The throat region 28 is filled with an injection-moulded elastomeric filler that embeds the heating elements 10. The filler forms an annular filler mass 30 that is circumferentially continuous and that spans the annulus 16 from the inner pipe 12 to the outer pipe 18, thus being in conforming sealing contact with the heating elements 10 and with both pipes 12, 18 along longitudinally-extending contact interfaces.

The annular filler mass 30 separates and supports the heating elements 10, fully surrounding, conforming to and sealing against each of those elements 10. Optionally, the annular filler mass 30 may extend longitudinally beyond the radially-narrowest part of the throat region 28, for example to fill the full radial width of the annulus 16 between the inner and outer pipes 12, 18. This better engages the filler mass 30 in the throat region 28 and so helps to resist a large pressure differential between sections of the annulus 16 to each side of the throat region 28.

In contrast, in the sealing arrangement 26 shown in FIG. 7, the circumferentially-spaced heating elements 10 extend beside each other through respective circumferentially-spaced, longitudinally-extending bores 32 disposed between the inner and outer pipes 12, 18. The internal diameter of each bore 32 is less than the full radial width of the annulus 16 between the inner and outer pipes 12, 18, and is only slightly greater than the thickness of the heating element 10 that the bore 32 contains. Again, therefore, the radial width of the annulus 16 is restricted in the bores 32 in comparison with the full radial width of the annulus 16 between the inner and outer pipes 12, 18.

The small clearance around each heating element 10 within its bore 32 is filled with an injection-moulded tubular body of elastomeric filler 34 that embeds the heating element 10. Thus, the heating elements 10 are separately embedded in the bodies of filler 34 in their respective bores 32. However, it is possible for the bodies of filler 34 to extend longitudinally beyond the bores 32 and optionally to fill the full radial width of the annulus 16 between the inner and outer pipes 12, 18. Thus, it is possible for the bodies of filler 34 to be part of a common filler mass that extends into the bores 32 and that is joined at longitudinally-offset positions outside the bores 32. Again, this better engages the filler mass relative to the bores 32 and so helps to resist a large pressure differential between sections of the annulus 16 to each side of the bores 32.

In effect, the circumferentially-spaced bores 32 of the sealing arrangement 26 shown in FIG. 7 define a throat region that is like the throat region 28 of FIG. 6 apart from being circumferentially discontinuous by virtue of circumferentially-spaced walls 36 that separate the bores 32.

Once the filler 30 or the bodies of filler 34 shown in FIGS. 6 and 7 have been injected and have cured or solidified, relative longitudinal movement between the inner and outer pipes 12, 18 may deform and pre-stress the filler material to improve sealing. Deformation of the filler material can then be maintained by fixing the inner and outer pipes 12, 18 against further relative longitudinal movement, preferably by welding or otherwise fixing the outer pipe 18 to an adjoining section of the outer pipe 18 or to another structure.

FIGS. 8a to 17 show various sealing arrangements that embody the principles of the embodiments shown in general terms in FIGS. 6 and 7.

FIGS. 8a to 8g are a sequence of views showing one way to assemble an ETH PiP sealing arrangement 24 as shown in FIG. 6. As noted above and as best shown in FIG. 8d, the sealing arrangement 24 is characterised by a throat region 28 at which the annulus 16 is radially narrowed and through which the heating elements 10 extend longitudinally. The throat region 28 extends continuously around the circumference of the annulus 16.

Figure 8A:
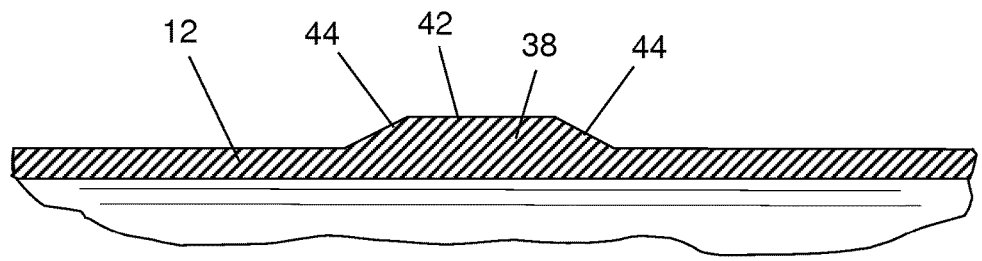
FIGS. 8a to 8g are a sequence of schematic sectional views showing the manufacture of an ETH PiP sealing arrangement that may be made by a method of the invention, FIGS. 8a to 8d and 8f being longitudinal sections and FIGS. 8e and 8g being cross-sections on line A-A of FIG. 8d and line B-B of FIG. 8f respectively.
Figure 8B:
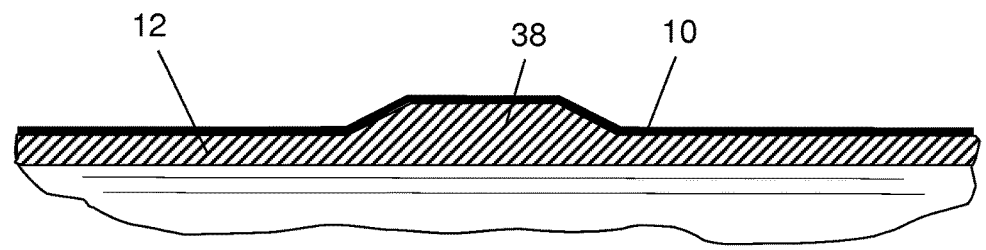
Figure 8C:
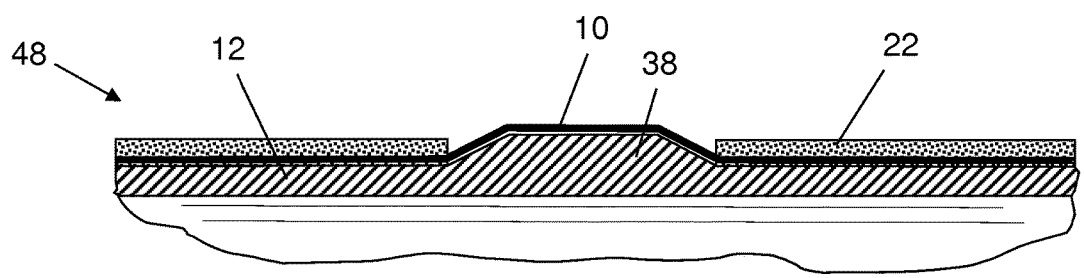
Figure 8D:
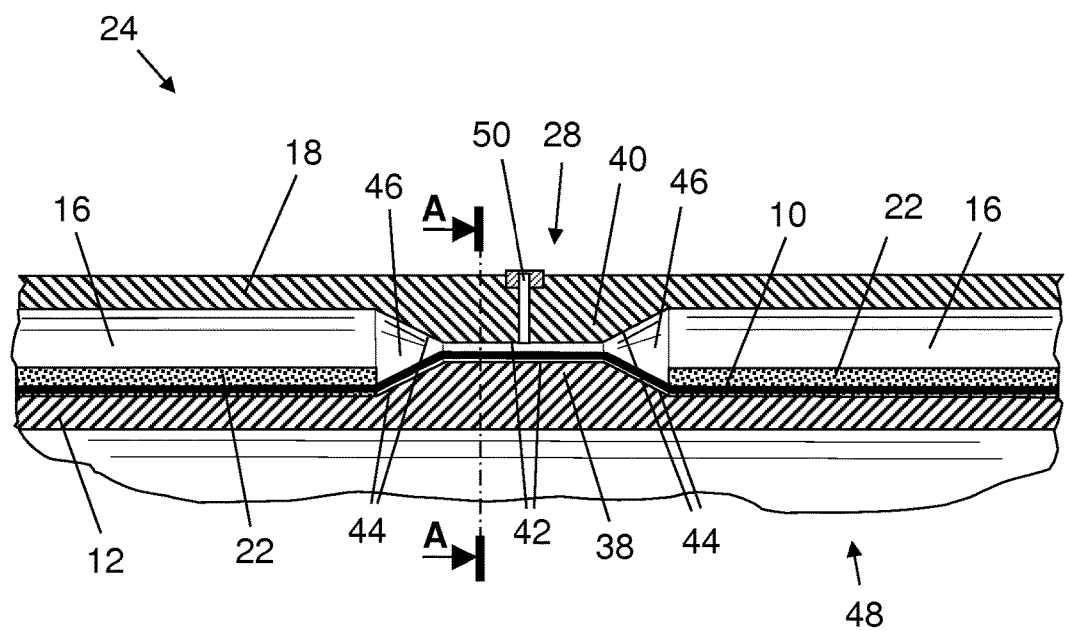

FIG. 8d shows that the throat region 28 is defined by opposed circumferential projections 38, 40 that extend into the annulus 16 to narrow the annulus 16. The projections 38, 40 are rotationally symmetrical about the common central longitudinal axis of the inner and outer pipes 12, 18. As noted previously, the inner and outer pipes 12, 18 are nominally concentric but may depart from exact concentricity in practice.

Specifically, an inner projection 38 of the inner pipe 12 projects radially outwardly into the annulus 16 toward the outer pipe 18; and a radially-opposed outer projection 40 of the outer pipe 18 projects radially inwardly into the annulus 16 toward the inner pipe 12. Longitudinally-extending lands 42 of the inner and outer projections 38, 40 confront each other across a narrow gap to define the throat region 28. The lands 42 are substantially parallel to the central longitudinal axis of the pipes 12, 18 in this example but as noted below, they could instead be inclined to the central longitudinal axis of the pipes 12, 18.

For simplicity, the inner and outer projections 38, 40 are shown here as being integral with the inner and outer pipes 12, 18. Integral projections 38, 40 may be particularly apt where either of the inner and outer pipes 12, 18 is of composite material. However, other embodiments to be described later will show how separate inner and outer projections 38, 40 may be incorporated into, or attached to, the inner and outer pipes 12, 18.

In longitudinal section as shown in FIG. 8a, the inner projection 38 comprises inclined frusto-conical shoulders 44 that extend from the inner pipe 12 to respective ends of the longitudinally-extending face or land 42. As can be appreciated from FIG. 8d, the outer projection 40 on the outer pipe 18 is a mirror image of the inner projection 38 and so has corresponding features.

In this example, the projections 38, 40 are generally symmetrical about a central transverse plane that is orthogonal to the central longitudinal axis of the pipes 12, 18 and that bisects the projections 38, 40. Thus, the shoulders 44 face away from each other in opposite longitudinal directions and with equal but opposite inclinations.

FIG. 8d shows that in the assembled ETH PiP sealing arrangement 24, the lands 42 of the inner and outer projections 38, 40 confront each other in parallel spaced concentric relation. The radially-opposed shoulders 44 of the inner and outer projections 38, 40 define longitudinally-tapering annular spaces 46 at each end of the throat region 28.

To start the assembly sequence, FIG. 8a shows a wall of the inner pipe 12 including the inner projection 38, which in turn comprises a land 42 and inclined shoulders 44. Next, FIG. 8b shows one of several longitudinally-extending heating elements 10 laid along the exterior of the inner pipe 12 to surmount and traverse the inner projection 38. Then, FIG. 8c shows an insulating layer 22 laid around the inner pipe 12 on top of the heating elements 10 to complete an inner pipe assembly 48. The insulating layer 22 is interrupted in the longitudinal direction to accommodate the inner projection 38. In this example, longitudinally-spaced portions of the insulating layer 22 terminate at the base of the shoulders 44.

Figure 8E:
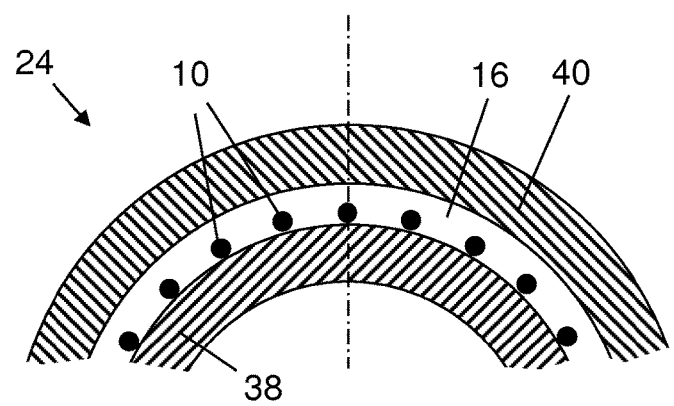

FIGS. 8d and 8e show the inner pipe assembly 48 placed into the outer pipe 18 to create the annulus 16, while bringing the inner and outer projections 38, 40 into longitudinal alignment to create the throat region 28 of the annulus 16. For example, the inner pipe assembly 48 may be inserted telescopically into the outer pipe 18. Alternatively, the outer pipe 18 may be assembled and fabricated around the inner pipe assembly 48.

Figure 8F:
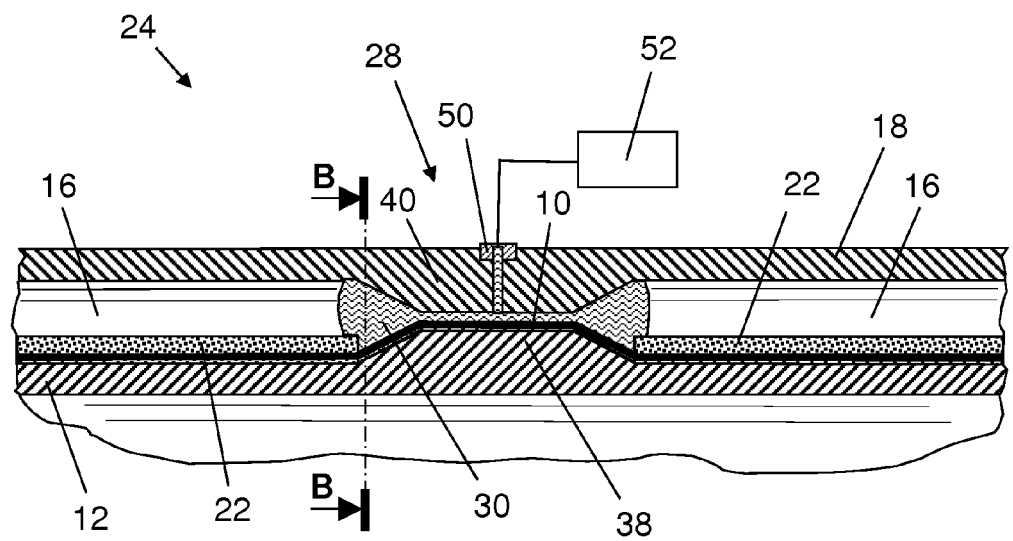
Figure 8G:
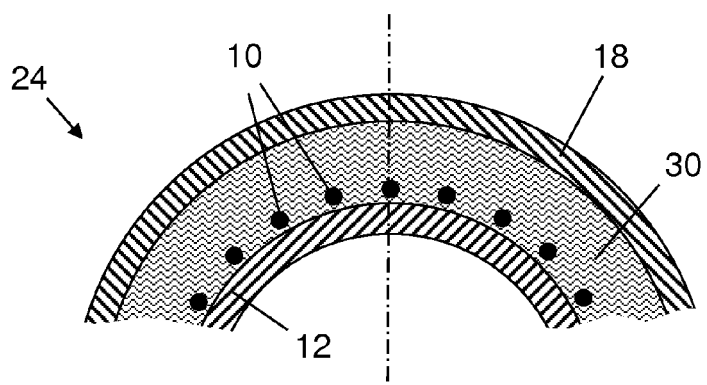

It will be apparent from FIG. 8d that the wall of the outer pipe 18 is penetrated by at least one radially-extending port 50. The port 50 may be one of multiple ports 50 distributed in angularly-spaced positions around the circumference of the outer pipe 18. The port 50 is aligned longitudinally with the outer projection 40 to communicate with the annulus 16 in the throat region 28, specifically with the narrow annular gap between the lands 42 of the inner and outer projections 38, 40. FIGS. 8f and 8g show the purpose of the port 50, which is to admit liquid filler material into the throat region of the annulus 16 under pressure from injection moulding apparatus 52. The filler material flows axially and circumferentially from the port 50 to fill the throat region 28 with a circumferentially-continuous annular filler mass 30 that cures and hardens to embed the heating elements 10. The port 50 can then be disconnected from the injection moulding apparatus 52 and closed with a welded or threaded filler plug.

Once the filler mass 30 has cured or solidified, relative longitudinal movement between the inner and outer pipes 12, 18 may deform and pre-stress the filler mass 30 to improve sealing. Deformation of the filler mass 30 can be maintained by fixing the inner and outer pipes 12, 18 against further relative longitudinal movement, preferably by welding or otherwise fixing the outer pipe 18 to an adjoining section of the outer pipe 18 or to another structure.

Where the lands 42 of the inner and outer projections 38, 40 are substantially parallel to the central longitudinal axis of the inner and outer pipes 12, 18, relative longitudinal movement between the pipes 12, 18 will impart shear deformation to the filler mass 30. However, it will be apparent that if the lands 42 instead have complementary frusto-conical inclinations to define opposed facing surfaces in interlocking relationship like those shown in FIGS. 2a to 2c and 4a to 4c, relative longitudinal movement between the pipes 12, 18 will also compress the filler mass 30. For the same reason, similarly inclined facing surfaces may be adopted for the embodiments illustrated in FIGS. 9 to 17 to be described below.

The filler mass 30 may be confined to the narrow annular gap between the lands 42 of the inner and outer projections 38, 40. Preferably, however, the filler mass 30 oozes out of that gap to extend and expand into the tapering annular spaces 46 between the radially-opposed shoulders 44 of the inner and outer projections 38, 40. This better engages the filler mass 30 in the throat region 30. For example, FIG. 8f shows the filler mass 30 extending to the base of the shoulders 44. There, the filler mass 30 meets the insulating layer 22 to maintain continuous thermal insulation along the length of the pipeline.

Figure 9:
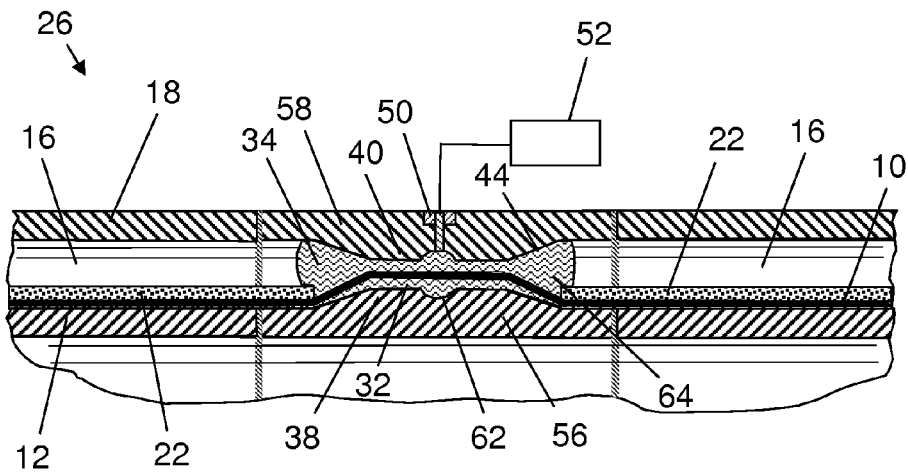
FIGS. 9 to 13 are schematic longitudinal sectional views of other ETH PiP sealing arrangements that may be made by a method of the invention.

FIG. 9 shows how separate inner and outer rings 56, 58 that are separately butt-welded to the inner and outer pipes 12, 18 respectively may be used to assemble an ETH PiP sealing arrangement 26 as shown in FIG. 7. The result is that the heating elements 10 are separately embedded in respective bodies of filler 34 in respective longitudinally-extending bores 32

The inner and outer rings 56, 58 may be machined, forged, cast or moulded. In the example shown in FIG. 9, the sealing arrangement 26 comprises cast steel inner and outer rings 56, 58 that are butt-welded in series with the inner and outer pipes 12, 18 respectively. Once welded into those positions, the inner and outer rings 56, 58 become integrated with the inner and outer pipes 12, 18 as extensions of the pipe walls. Thus, the concentric inner and outer rings 56, 58 are spaced to align with the inner and outer pipes 12, 18 respectively and to continue the annulus 16 between them.

In this embodiment, the inner and outer projections 38, 40 extend radially into the annulus 16 from the inner and outer rings 56, 58 respectively. In this respect, the inner and outer rings 56, 58 equate to the inner and outer pipes 12, 18 of the preceding embodiment. The bores 32 extend longitudinally between the inner and outer projections 38, 40.

The bores 32 are connected by a circumferential ring bore 62 that encircles the inner projection 38 and aligns with the port 50. The ring bore 62 serves as a manifold that effects fluid communication between the port 50 and all of the bores 32.

Like the preceding embodiment, the inner and outer projections 38, 40 each comprise inclined frusto-conical shoulders 44 that extend into the annulus 16 from the respective inner and outer rings 56, 58. The shoulders 44 narrow the annulus 16 from its full width so that the bores 32 are radially narrower than the full width of the annulus 16.

To start the assembly sequence, the inner ring 56 is welded to two sections of the inner pipe 12. Next, longitudinally-extending heating elements 10 are laid on the exterior of the inner pipe 12 and the inner ring. FIG. 9 also shows an insulating layer 22 laid around the inner pipe 12 on top of the heating elements 10. Again, the insulating layer 22 is interrupted in the longitudinal direction to accommodate the inner projection 38 of the inner ring 56.

Next, sections of the outer pipe 18 are welded to the outer ring 58 around the corresponding sections of the inner pipe 12 to create the annulus 16, which contains the heating elements 10 and the insulating layer 22.

A liquid or other flowable filler material injected through the port 50, through the ring bore 62 and into the bores 32 under pressure from injection moulding apparatus 52. The filler material flows circumferentially from the port 50 to fill the ring bore 62 and then flows axially into the bores 32 around the heating elements 10. This creates multiple tubular filler bodies 34, one in each bore 32, that cure and harden to embed the respective heating elements 10. As in the preceding embodiment, the port 50 can then be disconnected from the injection moulding apparatus 52 and closed with a welded or threaded filler plug.

The filler bodies 34 may be confined to the bores 32. Preferably, however, the filler material oozes out of the bores 32 to extend and expand into the tapering annular spaces 64 between the radially-opposed shoulders 44 of the inner and outer projections 38, 40. This better engages the filler bodies 34 with the bores 32. For example, FIG. 9 shows the filler bodies 34 merging into a circumferentially-continuous mass in the spaces 64, which mass extends to the base of the shoulders 44. There, the filler material meets the insulating layer 22 to maintain continuous thermal insulation along the length of the pipeline.

As before, once the filler bodies 34 have cured or solidified, relative longitudinal movement between the inner and outer pipes 12, 18 may deform and pre-stress the filler bodies 34 to improve sealing. Deformation of the filler bodies 34 can be maintained by fixing the inner and outer pipes 12, 18 against further relative longitudinal movement, preferably by welding or otherwise fixing the outer pipe 18 to an adjoining section of the outer pipe 18 or to another structure.

Once assembled in this way, inner and outer projections 38, 40 extend radially into the annulus 16 from the inner and outer rings 56, 58 respectively. The projections 38, 40 may abut or approach each other radially to define longitudinal bores 32 and a ring bore 62 between them as shown in FIG. 9, supplied with liquid filler material from an injection moulding apparatus 52 via a port 50. In that case, the longitudinal bores 32 and the ring bore 62 may be partially defined by grooves in the inner and outer projections 38, 40 that are brought together in mutual opposition to define the full bores 32, 62. Examples of this approach will be described below in more detail with reference to FIGS. 14a to 17. Alternatively, the projections 38, 40 may approach each other radially to define a circumferentially-continuous throat region like that shown in FIGS. 8a to 8g.

Figure 10:
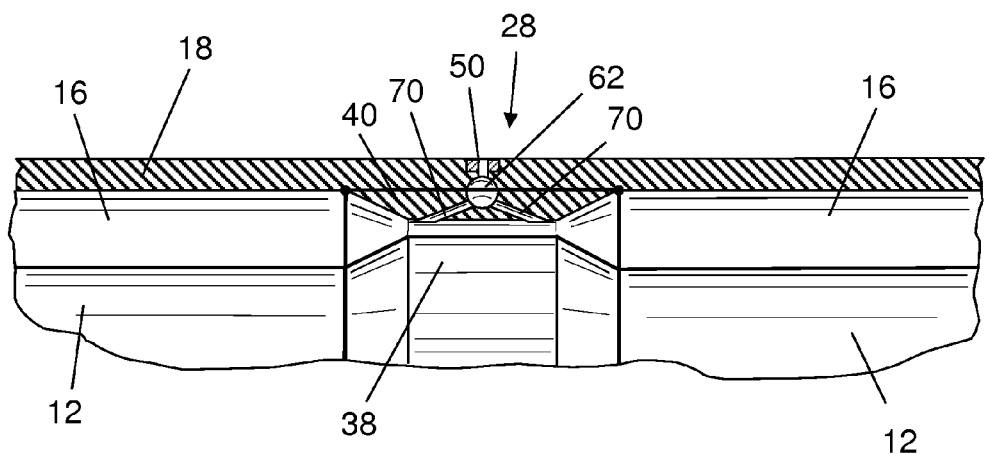

FIG. 10 shows that inner and/or outer projections 38, 40 may be separate from and attached to the inner and/or outer pipes 12, 18, for example by welding or bonding. The inner and/or outer projections 38, 40 may be machined, forged, cast or moulded. It will be evident to the skilled reader that the inner and/or outer projections 38, 40 could instead be similarly attached to inner and/or outer rings 66, 68 like those shown in FIG. 9.

In this example, the inner and outer projections 38, 40 approach each other radially to define a circumferentially-continuous throat region 28 like that shown in FIGS. 8a to 8g. However, the projections 38, 40 could instead abut or approach each other radially to define longitudinal bores and/or a ring bore between them as in FIG. 9.

FIG. 10 also shows that a ring bore 62 may be contained in the outer projection 40 or between the outer pipe 18 and the outer projection 40. In this example, the ring bore 62 is partially defined by circumferential grooves in the outer pipe 18 and the outer projection 40 that are brought together in mutual opposition to define the full ring bore 62.

As before, the ring bore 62 communicates with the port 50 in the outer pipe 18 to receive liquid filler material. In this example, the ring bore 62 also communicates with longitudinally-spaced channels 70 to distribute the filler material into the circumferential gap or into longitudinal bores between the inner and outer projections 38, 40. The channels 70 may be distributed in angularly-spaced positions around the circumference of the ring bore 62 and may be arranged singly or in groups such as pairs.

Figure 11:
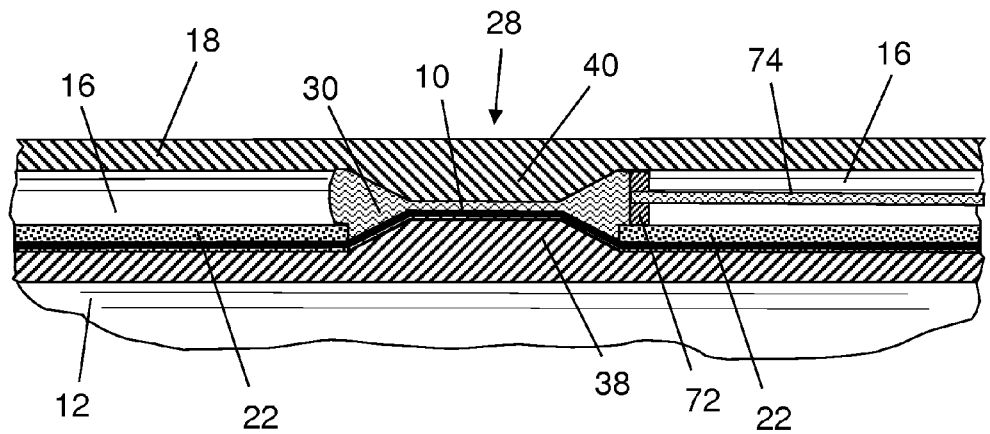

Turning next to FIG. 11, this shows that it is not essential to introduce liquid filler material via a port 50 as in the preceding embodiments. Here, instead, the liquid filler material is introduced via a filler head 72 that is supplied under pressure by a hose or pipe 74 extending along the annulus 16 from an external injection moulding apparatus, which is not shown in this diagram.

FIG. 11 shows the filler head 72 positioned in a section of the annulus 16 on one side of the throat region 28. A filler mass 30 of liquid filler material has been forced under pressure from the filler head 72 through the throat region 28 between the inner and outer projections 38, 40. The filler mass 30 therefore surrounds and embeds heating elements 10 extending through the throat region 28. Optionally, as shown, the filler mass 30 also extends into the section of annulus 16 on the other side of the throat region 28.

Figure 12:
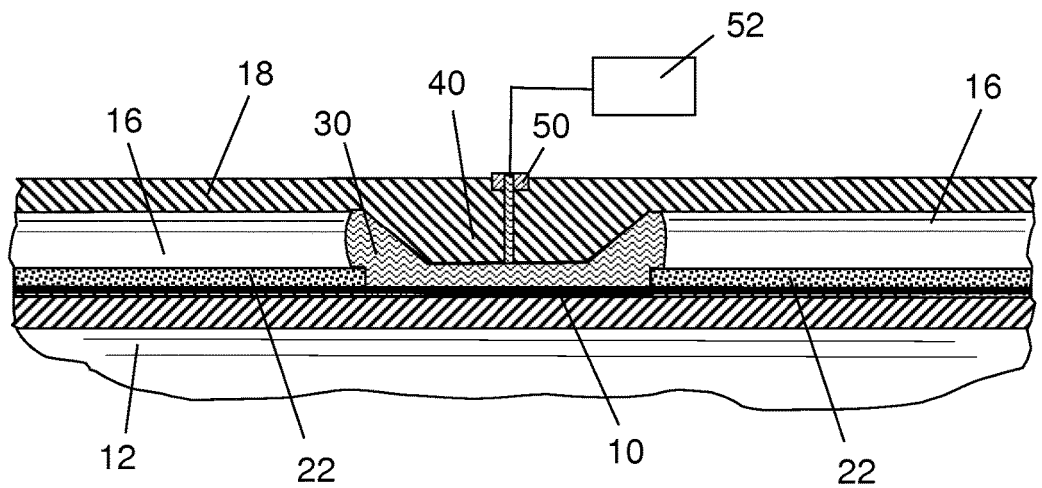

FIG. 12 shows that it is not essential for there to be symmetry between inner and outer projections 38, 40 to define a radially-narrowed gap through which the heating elements 10 extend. Indeed, FIG. 12 shows that it is not essential for there to be an inner projection 40 at all. Instead, FIG. 12 shows the heating elements 10 lying against the straight-sided exterior of the inner pipe 12. A radially-enlarged outer projection 40 is shown facing a longitudinally-extending gap in the insulating layer 22 that lies over the heating elements 10. The heating elements 10 span the gap. An injection moulding apparatus 52 has injected a filler mass 30 through a port 50 to fill the gap, embedding the heating elements 10 and maintaining thermal insulation despite the interruption of the insulating layer 22.

Figure 13:
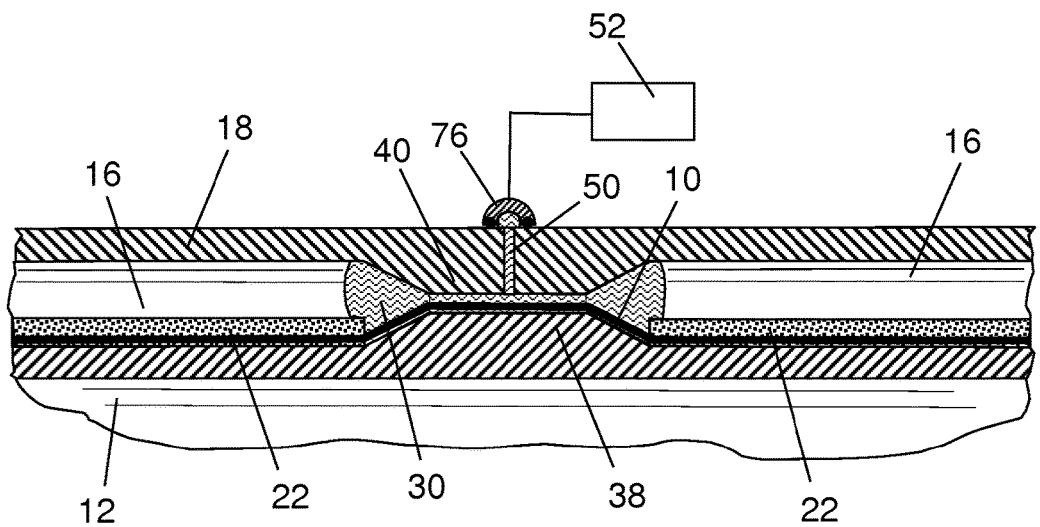

Liquid or other flowable filler material may be distributed circumferentially around a sealing arrangement by means other than a ring bore. For example, FIG. 13 shows an annular external channel 76 that is clamped around and sealed to the outer pipe 18. The channel 76 communicates with multiple radially-extending ports 50 distributed in angularly-spaced positions around the circumference of the outer pipe 18. The channel receives liquid filler material from an injection moulding apparatus 52 and distributes that material to the ports 50. The ports 50 then direct the liquid filler material into the gap between the inner and outer projections 38, 40, where it solidifies to form a filler mass 30 that embeds the heating elements 10 extending longitudinally through the gap.

Again, whilst a circumferentially-continuous gap is shown in FIGS. 11 to 13, the same principles may be applied to variants in which the heating elements 10 are housed in longitudinal bores.

Figure 14A:
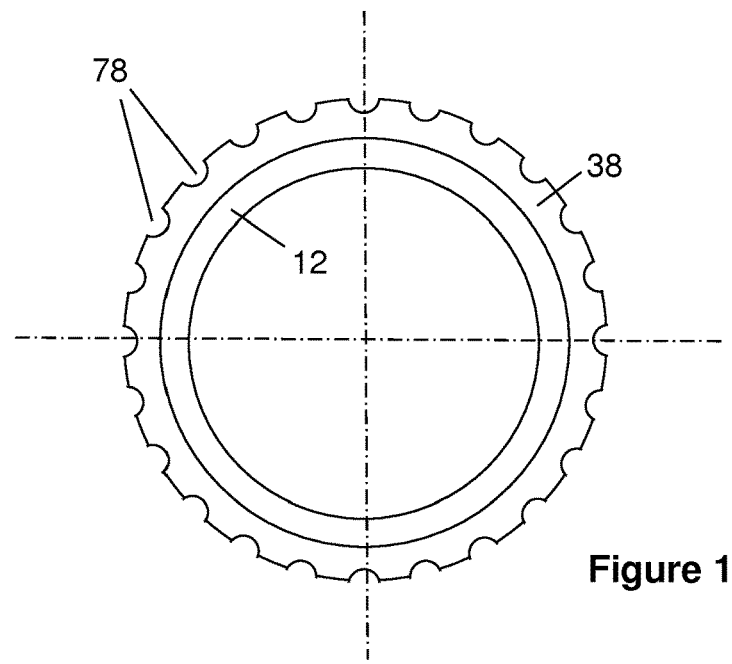
FIGS. 14a and 14b are schematic cross-sectional views, FIG. 14a showing an inner pipe and FIG. 14b showing an outer pipe for use together in another ETH PiP sealing arrangement as shown in FIG. 15 that may be made by a method of the invention.
Figure 14B:
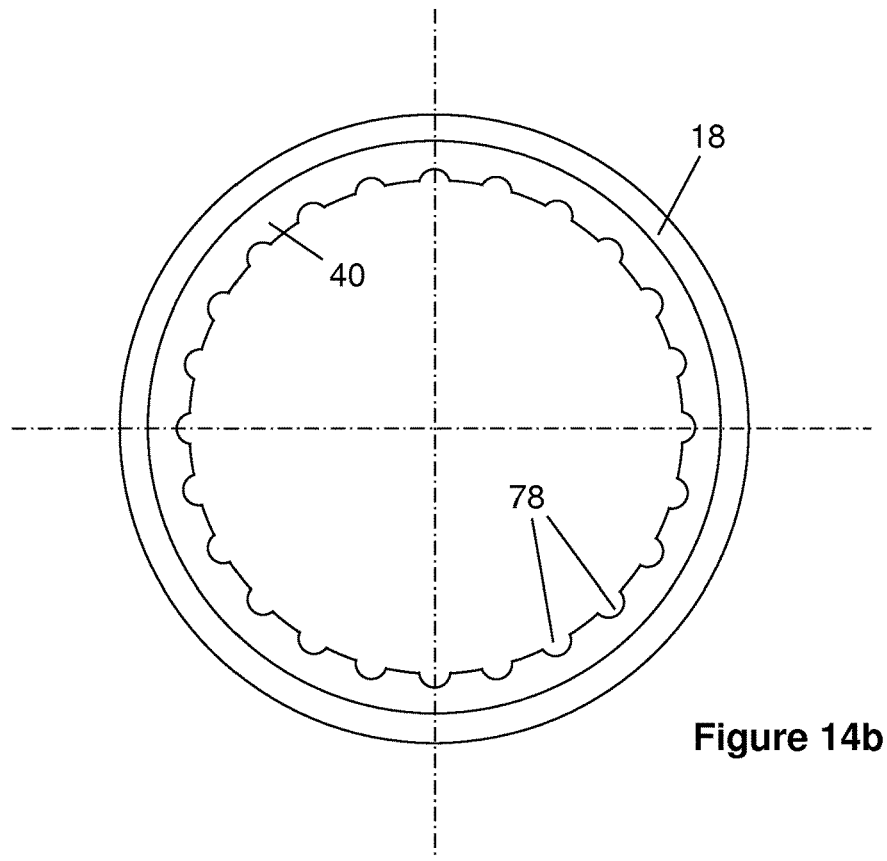

It has been mentioned above that the inner and outer projections 38, 40 may be shaped to define longitudinally-extending bores 32 between them when the projections 38, 40 are brought together to abut or approach each other radially. In this respect, FIGS. 14a and 14b show an inner projection 38 on an inner pipe 12 and an outer projection 40 on an outer pipe 18 respectively. Matching circumferential arrays of longitudinally-extending angularly-spaced grooves 78 are disposed around the outer face of the inner projection 38 and around the inner face of the outer projection 40.

Figure 15:
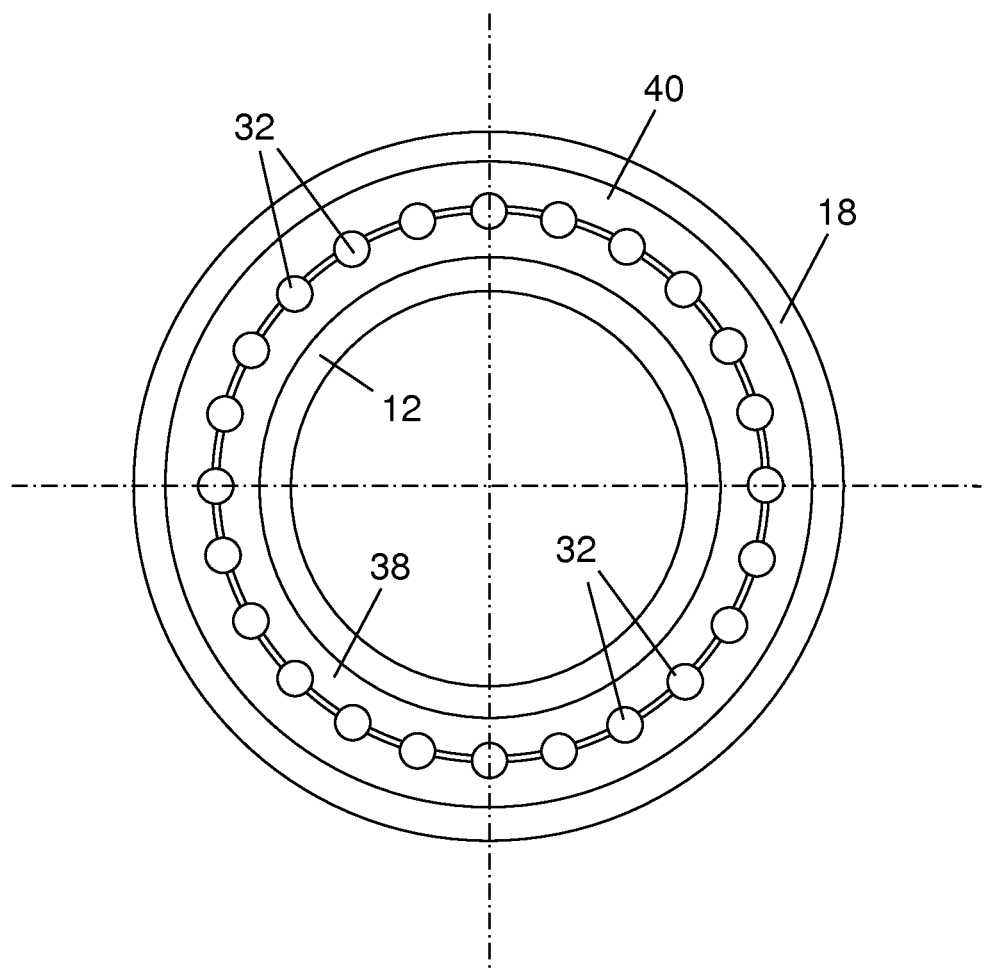
FIG. 15 is a schematic cross-sectional view showing the inner and outer pipes of FIGS. 14a and 14b respectively assembled together to form an ETH PiP sealing arrangement that may be made by a method of the invention.

As FIG. 15 shows, the internal diameter of the outer projection 40 slightly exceeds the external diameter of the inner projection 38, so that the inner pipe 12 can fit concentrically within the outer pipe 18 when the inner and outer projections 38, 40 are in longitudinal alignment. The grooves 78 are brought together in mutual opposition and radial alignment to define a circumferential array of longitudinally-extending angularly-spaced bores 32 as shown in FIG. 15.

Figure 16:
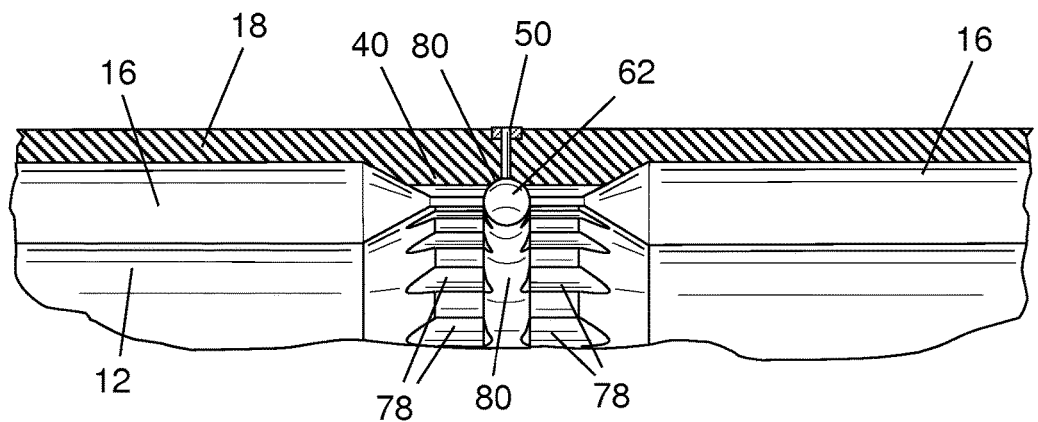
FIGS. 16 and 17 are schematic longitudinal sectional views of variants of the ETH PiP sealing arrangement shown in FIG. 15.
Figure 17:
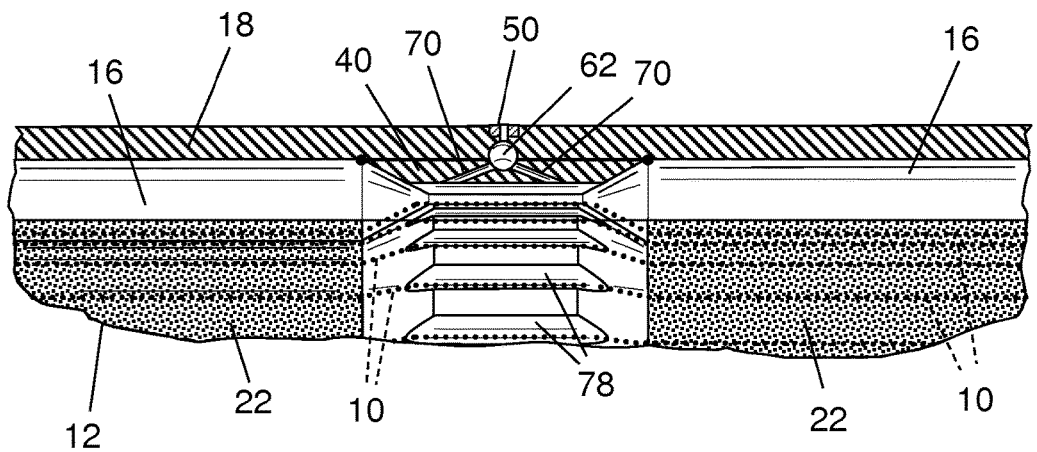

FIGS. 16 and 17 show different arrangements to provide for a flow of liquid filler material into the array of bores 32 shown in FIG. 15.

In the arrangement shown in FIG. 16, opposed circumferential grooves 80 encircle the inner and outer projections 38, 40 to define a circumferential ring bore 62 when the inner and outer pipes 12, 18 are brought together. A port 50 communicates with the ring bore 62.

In FIG. 16, the circumferential grooves 80 intersect the longitudinal grooves 78. Thus, the ring bore 62 defined by longitudinal alignment of the opposed circumferential grooves 80 connects the port 50 to the bores 32, which are defined in turn by radial alignment of the opposed longitudinal grooves 78.

FIG. 17 shows a variant that combines features of FIG. 10 with features of FIG. 15. Thus, the inner and/or outer projections 38, 40 are separate components that are welded to the inner and/or outer pipes 12, 18. Also, a ring bore 62 is partially defined by circumferential grooves in the outer pipe 18 and the outer projection 40 that are brought together in mutual opposition. The ring bore 62 communicates with a port 50 in the outer pipe 18 to receive liquid filler material. The liquid filler material is distributed into the longitudinal bores 32 via channels 70 spaced angularly around the circumference of the ring bore 62.

FIG. 17 also shows, in dotted lines, longitudinally-extending circumferentially-spaced heating elements 10. The heating elements 10 lie under an insulating layer 22 that is interrupted by the inner projection 38, where the heating elements 10 can be seen following the longitudinal grooves 78 that form the bores 32 seen in FIG. 15.

Figure 18:
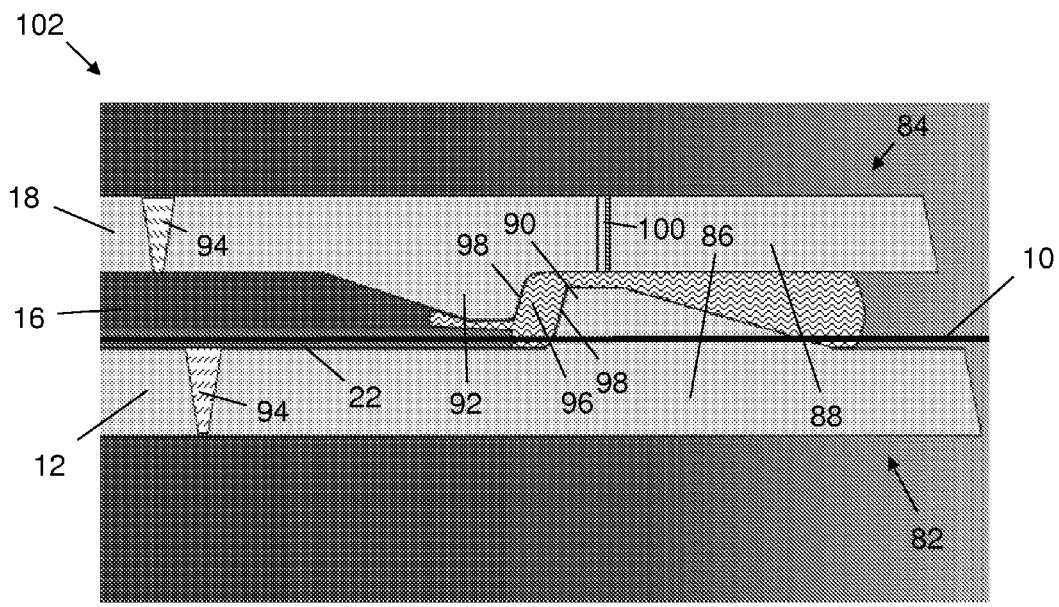
FIGS. 18 and 19 are schematic longitudinal sectional views of bulkhead assemblies that may be made by a method of the invention.
Figure 19:
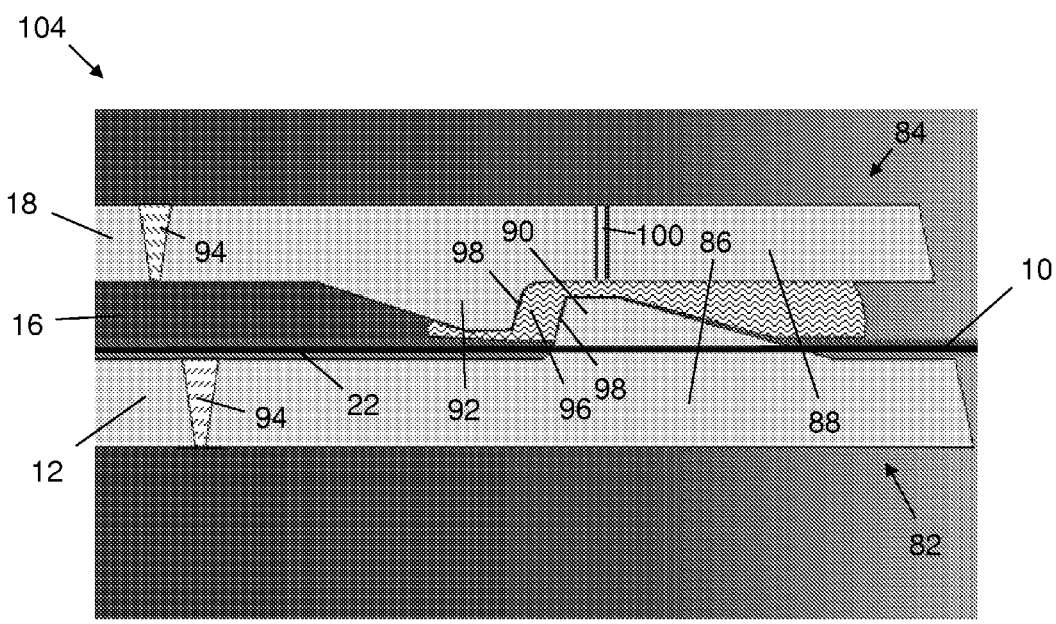

FIGS. 18 and 19 show bulkhead assemblies that may be made using methods of the invention. In each of these examples, an inner forging 82 and an outer forging 84 comprise inner and outer rings 86, 88 respectively in concentric relation. In this instance, inner and outer projections 90, 92 are integral with the rings 86, 88 of the forgings 82, 84 respectively. The rings 86, 88 of the forgings 82, 84 attach to ends of inner and outer pipes 12, 18 respectively. The annulus 16 between the pipes 12, 18 also extends between the rings 86,88 of the forgings 82, 84.

The forgings 82, 84 are shown in FIGS. 18 and 19 attached by butt welds 94 at one end of the rings 86, 88 to ends of the inner and outer pipes 12, 18 respectively. The other ends of the rings 86, 88 are shown in FIGS. 18 and 19 ready for welding to an intermediate or termination structure such as a pipeline accessory, or to an adjoining pipe length.

The embodiments shown in FIGS. 18 and 19 use a mass of an injected insulating polymer 96 as a seal, and optionally also as a spacer or buffer to effect mechanical coupling, between confronting shoulders 98 of the projections 90, 92 while isolating them thermally. The polymer 96 is injected through a port 100 that penetrates a wall of the outer ring 88.

In the bulkhead assembly 102 shown in FIG. 18, the insulating layer 22 has been cut back from the inner projection 90 to leave a gap between the end of the insulating layer 22 and the inner projection 90 where the inner ring 86 is exposed. There, the mass of injected polymer 96 seals against the exposed surface of the inner ring 86 and surrounds and embeds the heating elements 10, thus creating a gas-tight seal at an end of the annulus 16. The mass of injected polymer 96 also seals around the heating elements 10 where they are exposed on the other side of the inner projection 90. There, the inner pipe 12 is also exposed so that the injected polymer 96 seals against the exposed surface of the inner ring 86 in addition to surrounding and embedding the heating elements 10.

In the bulkhead assembly 104 shown in FIG. 19, the insulating layer 22 abuts both sides of the inner projection 90. The mass of injected polymer 96 lies against the insulating layer 22 on the radially outer side of that layer 22.

In both FIGS. 18 and 19, as before, once the mass of injected polymer 96 has cured or solidified, relative longitudinal movement between the inner and outer pipes 12, 18 may deform and pre-stress the mass 96 to improve sealing. Deformation of the mass 96 can be maintained by fixing the inner and outer pipes 12, 18 against further relative longitudinal movement, preferably by welding or otherwise fixing the outer pipe 18 to an adjoining section of the outer pipe 18 or to another structure.

Thus, for example, the inner pipe 12 may be welded to an intermediate or termination structure or to an adjoining pipe length, and then after displacing the outer pipe 18 relative to the inner pipe 12 to deform the mass of injected polymer 96, the outer pipe 18 may be welded to an intermediate or termination structure or to an adjoining pipe length. In the embodiments shown in FIGS. 18 and 19, the outer pipe 18 is suitably displaced to the right to compress the mass of injected polymer 96 in the gap between the confronting shoulders 98 of the projections 90, 92.

Various assembly methods can be used to make sealing arrangements of the invention. One example starts with sliding an outer pipe string relative to an inner pipe string so that the inner pipe string protrudes from the outer pipe string. Then, the following operations can be performed, albeit that not all of these operations must necessarily take place in the following order:

welding an inner ring comprising at least one inner projection to the inner pipe string;

passing heating elements over the inner projection or through grooves, bores or other openings in the inner projection;

wrapping a layer of thermal insulation material around the inner pipe string over the heating elements, except over the inner projection;

assembling or otherwise placing an outer ring comprising at least one outer projection around the inner ring;

placing a sealing mass, for example by injecting a flowable, settable filler material, into a gap or bore around the heating elements between the inner and outer projections;

moving the outer ring longitudinally relative to the inner ring to deform the sealing mass; and welding the outer ring to the outer pipe string.

It will be apparent that many other variations are possible without departing from the inventive concept. For example, either or both of the inner and outer projections may be continuous around the full circumference of the annulus. Alternatively, either or both of the inner and outer projections may be discontinuous circumferentially, being interrupted or penetrated by gaps, grooves or holes to accommodate longitudinal heating elements laid on the outside of the inner pipe. Indeed, either or both of the projections may be interrupted circumferentially to the extent that the projection comprises a circumferential array of angularly-spaced teeth.

Ring bores are only one example of channels that communicate between the or each port and the gaps or bores.

Sealing arrangements of the invention may comprise any number of ports or channels leading to the gaps or bores between the inner and outer projections. There may be any number of bores per port or channel; similarly, a channel like a ring bore may communicate with any number of bores.

A flowable polymer material may be poured through a port in a casting process rather than being injected under pressure. Mould plates may be inserted into the annulus to define the boundary of a moulding cavity.

As the filler material will flow into and close every bore with a sealing mass irrespective of the presence or otherwise an elongate element such as a heating wire, not every bore needs to contain such an element. Similarly, but more generally, it is not essential that elongate elements such as heating wires are distributed equally around the full circumference of the inner pipe.

The sealing mass could be an initially soft, pliable element that cures by hardening. The sealing mass may be plastically or elastically deformed by the act of placing the outer ring around the inner ring. Such deformation can conform the sealing mass to the confronting faces of the interlocking formations, to an outer surface of the inner ring and/or to an inner surface of the outer ring.

Thus, it is possible for a sealing mass to be shaped or moulded in place within the annulus rather than injected, or to be injected and moulded in combination. A flowable polymer material may be poured through a port in the outer ring in a casting process rather than being injected under pressure. Mould plates may be inserted into the annulus to define the boundary of the moulded part. In another approach that obviates a port, flowable polymer material can be injected, poured and/or moulded through the annulus if the annulus is accessible, for example via an injection pipe running inside the annulus leading to an injection nozzle.

The invention claimed is:

1. A method of sealing an annulus between inner and outer pipe sections of a pipe-in- pipe system, the method comprising:
   positioning a sealing mass in the annulus in contact with the inner and outer pipe sections;
   deforming the sealing mass by effecting relative longitudinal movement between the inner and outer pipe sections;
   providing a pipe-in-pipe structure comprising inner and outer pipes; and
   fixing the inner and outer pipe sections against reverse relative longitudinal movement to maintain deformation of the sealing mass by fixing the inner pipe section to the inner pipe of the pipe-in-pipe structure and the outer pipe section to the outer pipe of the pipe-in-pipe structure.

2. The method of claim 1, comprising shearing the sealing mass between the inner and outer pipe sections.

3. The method of claim 1, comprising compressing the sealing mass between the inner and outer pipe sections.

4. The method of claim 3, comprising compressing the sealing mass by advancing a ramp surface extending into the annulus from at least one of the inner and outer pipe sections, the ramp surface being inclined relative to the direction of longitudinal movement.

5. The method of claim 4, comprising compressing the sealing mass between opposed ramp surfaces extending into the annulus from respective ones of the inner and outer pipe sections, said relative longitudinal movement between the inner and outer pipe sections moving the opposed ramp surfaces toward each other.

6. The method of claim 4, wherein the or each ramp surface has an inclination of 5 ° to 10 ° relative to the direction of longitudinal movement.

7. The method of claim 1, comprising positioning the sealing mass by casting or moulding the sealing mass in situ between the inner and outer pipe sections.

8. The method of claim 1, comprising positioning the sealing mass on the inner pipe section before placing the outer pipe section around the sealing mass and the inner pipe section.

9. The method of claim 1, comprising positioning the sealing mass around at least one elongate element extending longitudinally along the annulus.

10. The method of claim 9, preceded by placing the or each elongate element on the inner pipe section.

11. The method of claim 10, comprising diverting the or each elongate element over a radial projection of the inner pipe section.

12. The method of claim 10, comprising extending the or each elongate element through a radial projection of the inner pipe section.

13. The method of claim 9, wherein at least one elongate element is a heating element.

14. The method of claim 1, comprising:
   fixing the inner pipe section to an inner pipe of the pipe-in-pipe structure before arranging the outer pipe section around the inner pipe section, axially spaced from the outer pipe of the pipe-in-pipe structure;
   placing the sealing mass between opposed faces of the inner and outer pipe sections;
   displacing the outer pipe section toward the structure to deform the sealing mass; and
   fixing the displaced outer pipe section to the outer pipe of the pipe-in-pipe structure.

15. The method of claim 14, comprising fixing the inner pipe section and the displaced outer pipe section by welding them to the respective pipes of the structure.

16. A pipe-in-pipe system comprising an annulus defined between inner and outer pipe sections, the system comprising:
   a sealing mass positioned in the annulus in contact with the pipe sections, the sealing mass having been deformed by relative longitudinal movement between the pipe sections; and
   at least one fixing at an end of at least one of the pipe sections that holds the pipe sections against reverse relative longitudinal movement to maintain the deformation of the sealing mass, wherein the or each fixing comprises at least one of a fixing between the outer pipe section and an outer pipe of an adjoining pipe-in-pipe structure and a fixing between the inner pipe section and an inner pipe of an adjoining pipe-in-pipe structure.

17. The system of claim 16, wherein the or each fixing comprises a weld between the outer pipe section and an outer pipe of an adjoining pipe-in-pipe structure.

18. The system of claim 16, wherein the sealing mass is deformed by shearing between the pipe sections.

19. The system of claim 16, wherein the sealing mass is deformed by compression between the pipe sections.

20. The system of claim 16, wherein at least one ramp surface extends into the annulus from at least one of the pipe sections toward the other of the pipe sections, the ramp surface being inclined relative to the longitudinal direction and bearing on the sealing mass to deform the sealing mass.

21. The system of claim 20, wherein a ramp surface extending into the annulus from the inner pipe section faces away from the or each fixing.

22. The system of claim 20, wherein a ramp surface extending into the annulus from the outer pipe section faces toward the or each fixing.

23. The system of claim 20, comprising opposed ramp surfaces, each inclined relative to the longitudinal direction, extending into the annulus from respective ones of the pipe sections, the sealing mass being compressed between the ramp surfaces.

24. The system of claim 23, wherein the ramp surfaces have substantially identical inclinations relative to the longitudinal direction.

25. The system of claim 20, wherein the or each ramp surface has an inclination of 5° to 10° relative to the longitudinal direction.

26. The system of claim 20, wherein at least one projection extends radially into the annulus from at least one of the pipe sections toward the other of the pipe sections to define the or each ramp surface.

27. The system of claim 26, wherein the or each radially-extending projection has a smoothly-rounded apex adjoining the ramp surface.

28. The system of claim 16, wherein the sealing mass surrounds at least one elongate element extending longitudinally along the annulus.

29. The system of claim 26, wherein the sealing mass surrounds at least one elongate element extending longitudinally along the annulus.

30. The system of claim 29, wherein the or each elongate element is diverted over a radially-extending projection of the inner pipe section.

31. The system of claim 29, wherein the or each elongate element extends through a radially-extending projection of the inner pipe section.

32. The system of claim 29, wherein at least one elongate element is a heating element.

* * * * *